US012562661B2

(12) United States Patent
Oyokawa et al.

(10) Patent No.: US 12,562,661 B2
(45) Date of Patent: Feb. 24, 2026

(54) STEPPING MOTOR CONTROL DEVICE, MOVEMENT, WATCH, AND STEPPING MOTOR CONTROL METHOD

(71) Applicant: SEIKO WATCH KABUSHIKI KAISHA, Tokyo (JP)

(72) Inventors: Ryota Oyokawa, Tokyo (JP); Tomohiro Ihashi, Tokyo (JP); Masayuki Nakamura, Tokyo (JP)

(73) Assignee: SEIKO WATCH KABUSHIKI KAISHA, Tokyo (JP)

( * ) Notice: Subject to any disclaimer, the term of this patent is extended or adjusted under 35 U.S.C. 154(b) by 186 days.

(21) Appl. No.: 18/599,769

(22) Filed: Mar. 8, 2024

(65) Prior Publication Data

US 2024/0313677 A1 Sep. 19, 2024

(30) Foreign Application Priority Data

Mar. 14, 2023 (JP) ................................. 2023-039436

(51) Int. Cl.
*H02P 8/16* (2006.01)
*G04C 3/14* (2006.01)
*H02P 8/40* (2006.01)
(52) U.S. Cl.
CPC ................ *H02P 8/40* (2013.01); *G04C 3/146* (2013.01)
(58) Field of Classification Search
CPC ........... G04C 3/143; G04C 3/146; H02P 8/16; H02P 8/40
USPC ........................................................ 318/696
See application file for complete search history.

(56) References Cited

U.S. PATENT DOCUMENTS

| | | | | | |
|---|---|---|---|---|---|
| 8,251,575 B2 * | 8/2012 | Sato | ........................ | G04C 3/143 |
| | | | | | 368/200 |
| 8,351,303 B2 * | 1/2013 | Ogasawara | ............. | B60L 15/42 |
| | | | | | 368/80 |
| 11,500,335 B2 * | 11/2022 | Maruyama | ................ | G04C 3/14 |
| 2006/0209637 A1 * | 9/2006 | May | ........................ | G04C 17/00 |
| | | | | | 368/223 |

(Continued)

FOREIGN PATENT DOCUMENTS

JP 2018119825 A 8/2018

*Primary Examiner* — Gabriel Agared
(74) *Attorney, Agent, or Firm* — Crowell & Moring LLP

(57) ABSTRACT

Provided is a stepping motor control device that prevents a terminal voltage of a battery from decreasing even when a plurality of motors are driven simultaneously at a high speed. The stepping motor control device includes: a control unit configured to control a driving unit that drives a plurality of motors including a first motor driven at a prescribed driving cycle, and a second motor driven at a driving cycle that is the same as or an integral multiple of the driving cycle of the first motor to drive the motors by outputting a driving pulse; and a storage unit configured to store a width of the first driving pulse and a width of the second driving pulse. When a sum of a pulse width of the first driving pulse and a pulse width of the second driving pulse is longer than the driving cycle of the first motor, in the driving cycle of the first motor, a part of the first driving pulse and at least a part of the second driving pulse are simultaneously output, and a pause period is provided, in which neither the first driving pulse nor the second driving pulse is output after the first driving pulse and the second driving pulse are output and before a start timing of a next driving cycle of the first motor.

15 Claims, 16 Drawing Sheets

(56)                   References Cited

U.S. PATENT DOCUMENTS

2009/0067296 A1*    3/2009   Schneider ............. G04B 15/10
                                                    368/140
2017/0212477 A1*    7/2017   Yamamoto ............... H02K 3/28
2019/0121296 A1*    4/2019   Ogasawara .............. H02P 8/34
2022/0163927 A1*    5/2022   Nozawa ............... G04G 9/0082
2022/0397867 A1*   12/2022   Fleury ................... G04C 3/146

* cited by examiner

| DRIVING PRIORITY ORDER | |
|---|---|
| 1 | MOTOR THAT DRIVES 1/100 SECONDS HAND |
| 2 | MOTOR THAT DRIVES 1/10 SECONDS HAND |
| 3 | MOTOR THAT DRIVES 1 SECOND HAND |
| 4 | MOTOR THAT DRIVES MINUTE HAND |
| 5 | MOTOR THAT DRIVES HOUR HAND |

FIG. 8

| NUMBER OF DRIVING STEPS FOR ONE ROTATION | |
|---|---|
| MOTOR THAT DRIVES 1/100 SECONDS HAND | 20 |
| MOTOR THAT DRIVES 1/10 SECONDS HAND | 20 |
| MOTOR THAT DRIVES 1 SECOND HAND | 60 |
| MOTOR THAT DRIVES MINUTE HAND | 360 |
| MOTOR THAT DRIVES HOUR HAND | 360 |

FIG. 9

| MAXIMUM DRIVING FREQUENCY | |
|---|---|
| MOTOR THAT DRIVES 1/100 SECONDS HAND | 200Hz |
| MOTOR THAT DRIVES 1/10 SECONDS HAND | 200Hz |
| MOTOR THAT DRIVES 1 SECOND HAND | 100Hz |
| MOTOR THAT DRIVES MINUTE HAND | 200Hz |
| MOTOR THAT DRIVES HOUR HAND | 200Hz |

FIG. 13

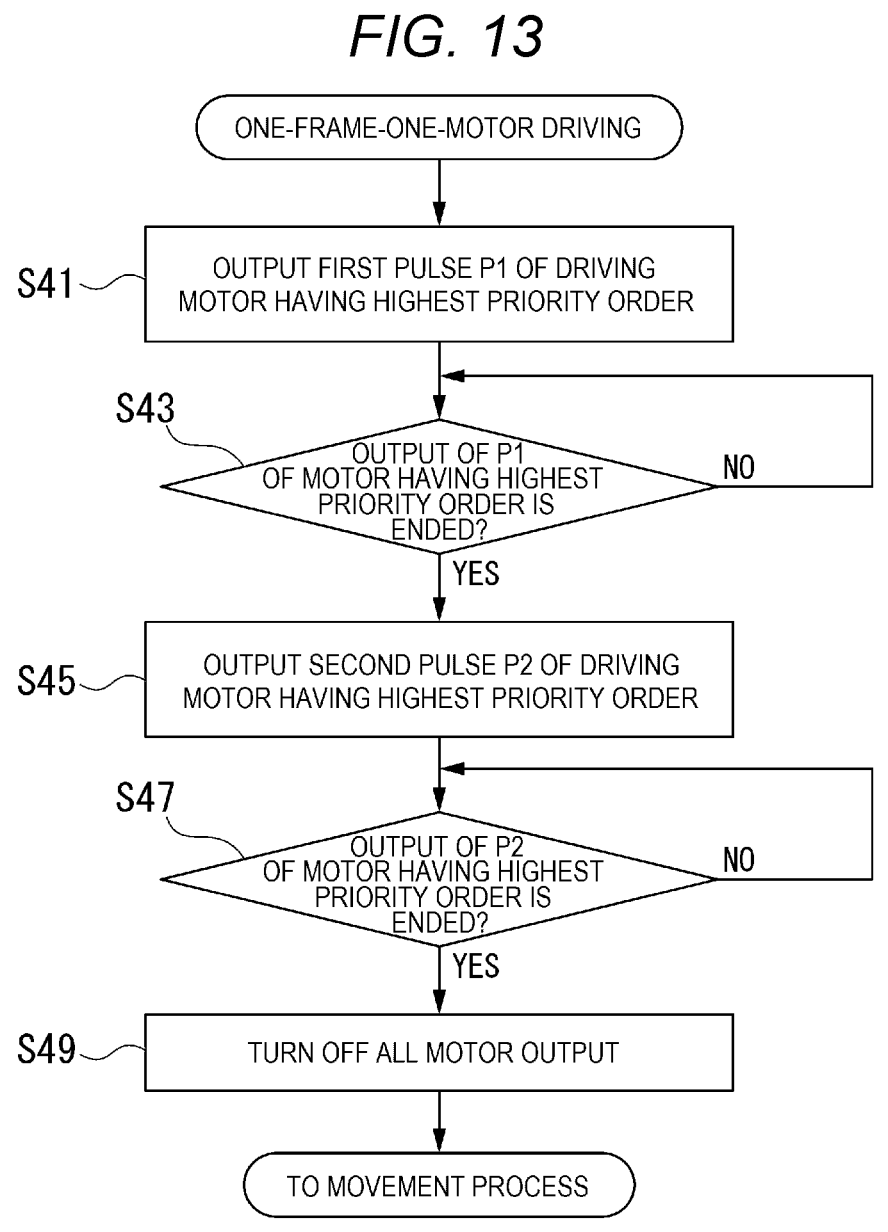

```
        ┌─────────────────────────────────────────┐
        │     ONE-FRAME-ONE-MOTOR DRIVING         │
        └─────────────────────────────────────────┘
                            │
                            ▼
        ┌─────────────────────────────────────────┐
  S41   │   OUTPUT FIRST PULSE P1 OF DRIVING       │
        │ MOTOR HAVING HIGHEST PRIORITY ORDER      │
        └─────────────────────────────────────────┘
                            │
                            ▼
                    OUTPUT OF P1
  S43        OF MOTOR HAVING HIGHEST      NO
             PRIORITY ORDER IS
                    ENDED?
                            │ YES
                            ▼
        ┌─────────────────────────────────────────┐
  S45   │  OUTPUT SECOND PULSE P2 OF DRIVING       │
        │ MOTOR HAVING HIGHEST PRIORITY ORDER      │
        └─────────────────────────────────────────┘
                            │
                            ▼
                    OUTPUT OF P2
  S47        OF MOTOR HAVING HIGHEST      NO
             PRIORITY ORDER IS
                    ENDED?
                            │ YES
                            ▼
        ┌─────────────────────────────────────────┐
  S49   │        TURN OFF ALL MOTOR OUTPUT         │
        └─────────────────────────────────────────┘
                            │
                            ▼
        ┌─────────────────────────────────────────┐
        │          TO MOVEMENT PROCESS            │
        └─────────────────────────────────────────┘
```

FIG. 16B

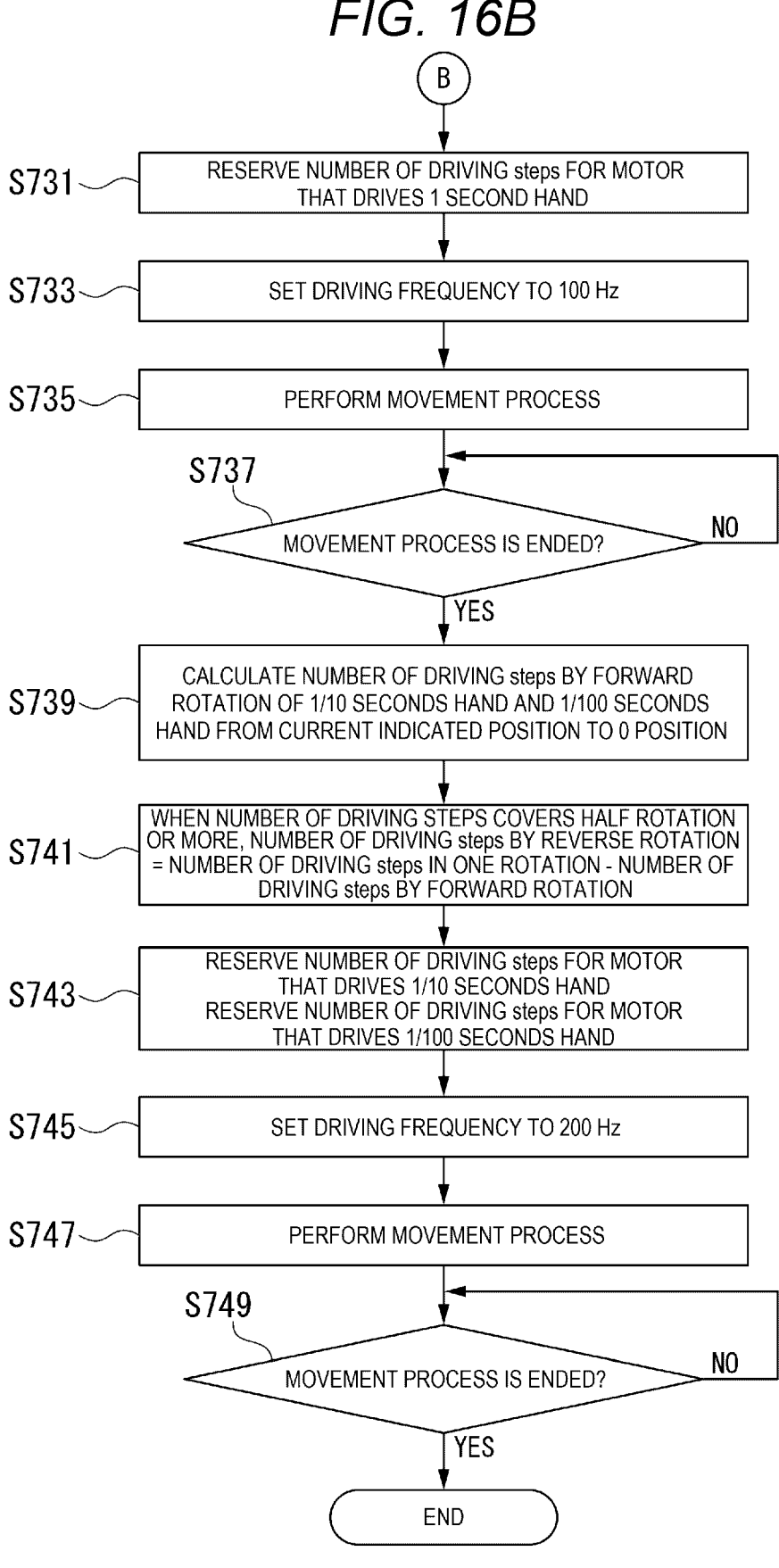

B

S731 — RESERVE NUMBER OF DRIVING steps FOR MOTOR THAT DRIVES 1 SECOND HAND

S733 — SET DRIVING FREQUENCY TO 100 Hz

S735 — PERFORM MOVEMENT PROCESS

S737 — MOVEMENT PROCESS IS ENDED? — NO

YES

S739 — CALCULATE NUMBER OF DRIVING steps BY FORWARD ROTATION OF 1/10 SECONDS HAND AND 1/100 SECONDS HAND FROM CURRENT INDICATED POSITION TO 0 POSITION S741 — WHEN NUMBER OF DRIVING STEPS COVERS HALF ROTATION OR MORE, NUMBER OF DRIVING steps BY REVERSE ROTATION = NUMBER OF DRIVING steps IN ONE ROTATION - NUMBER OF DRIVING steps BY FORWARD ROTATION S743 — RESERVE NUMBER OF DRIVING steps FOR MOTOR THAT DRIVES 1/10 SECONDS HAND RESERVE NUMBER OF DRIVING steps FOR MOTOR THAT DRIVES 1/100 SECONDS HAND S745 — SET DRIVING FREQUENCY TO 200 Hz

S747 — PERFORM MOVEMENT PROCESS

S749 — MOVEMENT PROCESS IS ENDED? — NO

YES

END

STEPPING MOTOR CONTROL DEVICE, MOVEMENT, WATCH, AND STEPPING MOTOR CONTROL METHOD

RELATED APPLICATIONS

This application claims priority to Japanese Patent application No. JP2023-039436, filed on Mar. 14, 2023, the entire content of which is incorporated herein by reference.

BACKGROUND OF THE INVENTION

1. Field of the Invention

The present invention relates to a stepping motor control device, a movement, a watch, and a stepping motor control method.

2. Description of the Related Art

In an electronic watch including a plurality of motors for driving hands in the related art, it may be desired to drive the plurality of motors simultaneously. When the plurality of motors are driven simultaneously, a plurality of driving pulses are output to the respective motors simultaneously, generation timings of peak currents of the plurality of motors coincide with each other, and a decrease amount of a terminal voltage of a battery instantaneously deepens. The terminal voltage of the battery may instantaneously decrease and fall below an operating voltage, resulting in malfunction. In order to solve such a problem, the number of motors that can be driven simultaneously is controlled. As a literature that discloses a technique for controlling the number of motors that can be driven simultaneously, for example, JP2018-119825A can be exemplified.

3. Citations

Patent Literature: PTL 1: JP2018-119825A

According to JP2018-119825A, by shifting an output timing of a pulse, it is possible to shift a generation timing of a peak current in each of a plurality of motors and reduce a decrease amount in a voltage of a battery. Here, when the generation timing of the peak current of the motor is shifted to reduce an instantaneous consumption current to be low, the battery continuously outputs a motor driving current. Due to a characteristic of a battery, when a large current that is used to drive the motor is passed through the battery, the terminal voltage of the battery decreases due to an internal resistance of the battery. In addition, there is a characteristic that once the terminal voltage of the battery is decreased, the terminal voltage does not immediately recover. Therefore, when the motor driving current continues to flow continuously, the current continues to be consumed without recovering the terminal voltage of the battery, and the terminal voltage will gradually decrease. As the terminal voltage gradually decreases, the terminal voltage may fall below the operating voltage. In particular, such a problem is desired to be solved in an electronic watch including hands that are driven at a high speed, such as a $\frac{1}{100}$ seconds hand.

SUMMARY OF THE INVENTION

The invention has been made in view of such a situation, and an object thereof is to provide a stepping motor control device, a movement, a watch, and a stepping motor control method capable of preventing a decrease in a terminal voltage of a battery even when a plurality of motors are driven simultaneously at a high speed.

(1) A first aspect of the present embodiment provides a stepping motor control device including: a control unit configured to control a driving unit that drives a plurality of motors including a first motor driven at a prescribed driving cycle and a second motor driven at a driving cycle that is the same as or an integral multiple of the driving cycle of the first motor to drive the first motor by outputting a first driving pulse and to drive the second motor by outputting a second driving pulse; and a storage unit configured to store a width of the first driving pulse and a width of the second driving pulse, in which when a sum of a pulse width of the first driving pulse and a pulse width of the second driving pulse is longer than the driving cycle of the first motor, in the driving cycle of the first motor, a part of the first driving pulse and at least a part of the second driving pulse are simultaneously output, and a pause period is provided, in which neither the first driving pulse nor the second driving pulse is output after the first driving pulse and the second driving pulse are output and before a start timing of a next driving cycle of the first motor.

(2) According to the first aspect of the present embodiment, in the stepping motor control device according to (1), the storage unit further stores a prescribed time from when the first driving pulse is output to when the second driving pulse is output, and the control unit outputs the second driving pulse after the prescribed time elapses after the first driving pulse is output.

(3) According to the first aspect of the present embodiment, in the stepping motor control device according to (1) or (2), the storage unit stores an upper limit value of the number of motors that can be driven simultaneously and a priority order for each of the plurality of motors controlled by the control unit, and when the number of motors to be driven simultaneously exceeds the upper limit value, the control unit drives a motor having a highest priority order, and drives a motor having a second highest priority order after the motor having the highest priority order stops.

(4) According to the first aspect of the present embodiment, in the stepping motor control device according to any one of (1) to (3), the control unit drives a plurality of motors having different measurement units, the priority order is set according to the measurement unit of each of the motors, and the priority order of a motor having a small measurement unit is higher than the priority order of a motor having a large measurement unit.

(5) According to the first aspect of the present embodiment, in the stepping motor control device according to any one of (1) to (4), the control unit further drives a third motor by outputting a third driving pulse, and the upper limit value of the number of motors that can be driven simultaneously stored in the storage unit is two.

(6) According to the first aspect of the present embodiment, in the stepping motor control device according to any one of (1) to (5), the first motor is a motor that drives a $\frac{1}{100}$ seconds hand, the second motor is a motor that drives a $\frac{1}{10}$ seconds hand, the third motor is a motor that drives a 1 second hand, and the priority order of the first motor is set to be highest.

(7) According to the first aspect of the present embodiment, in the stepping motor control device according to any one of (1) to (6), the control unit operates prescribed motors in combination, and drives a next combination of motors after the operation of the combined motors ends.

(8) A second aspect of the present embodiment provides a movement including: the stepping motor control device according to any one of (1) to (7); the first motor; and the second motor.

(9) A third aspect of the present embodiment provides a watch including the movement according to (8).

(10) A fourth aspect of the present embodiment provides a stepping motor control method including: a control step of controlling a driving unit that drives a plurality of motors including a first motor driven at a prescribed driving cycle, and a second motor driven at a driving cycle that is the same as or an integral multiple of the driving cycle of the first motor to drive the first motor by outputting a first driving pulse and to drive the second motor by outputting a second driving pulse; and a storage step of storing a width of the first driving pulse and a width of the second driving pulse, in which when a sum of a pulse width of the first driving pulse and a pulse width of the second driving pulse is longer than the driving cycle of the first motor, in the driving cycle of the first motor, a part of the first driving pulse and at least a part of the second driving pulse are simultaneously output, and a pause period is provided, in which neither the first driving pulse nor the second driving pulse is output after the first driving pulse and the second driving pulse are output and before a start timing of a next driving cycle of the first motor.

According to the invention, even when a plurality of motors are driven simultaneously at a high speed, a decrease in the terminal voltage of the battery can be prevented.

BRIEF DESCRIPTION OF THE DRAWINGS

FIG. 2 is a diagram showing an arrangement example of a $\frac{1}{100}$ seconds hand, a $\frac{1}{10}$ seconds hand, a second hand, a minute hand, and an hour hand of the watch according to the present embodiment;

FIG. 7 is a diagram showing an example of a driving priority order according to the present embodiment;

FIG. 8 is a diagram showing an example of the number of driving steps according to the present embodiment;

FIG. 9 is a diagram showing an example of a maximum driving frequency according to the present embodiment;

FIG. 13 is a fourth flowchart showing an example of a stopwatch clocking process of the watch according to the present embodiment;

FIG. 16B is a second diagram of the seventh flowchart showing the example of the stopwatch clocking process of the watch according to the present embodiment.

DETAILED DESCRIPTION OF THE PREFERRED EMBODIMENTS

Hereinafter, an embodiment of the invention will be described with reference to the drawings.

EMBODIMENT

Figure 1:
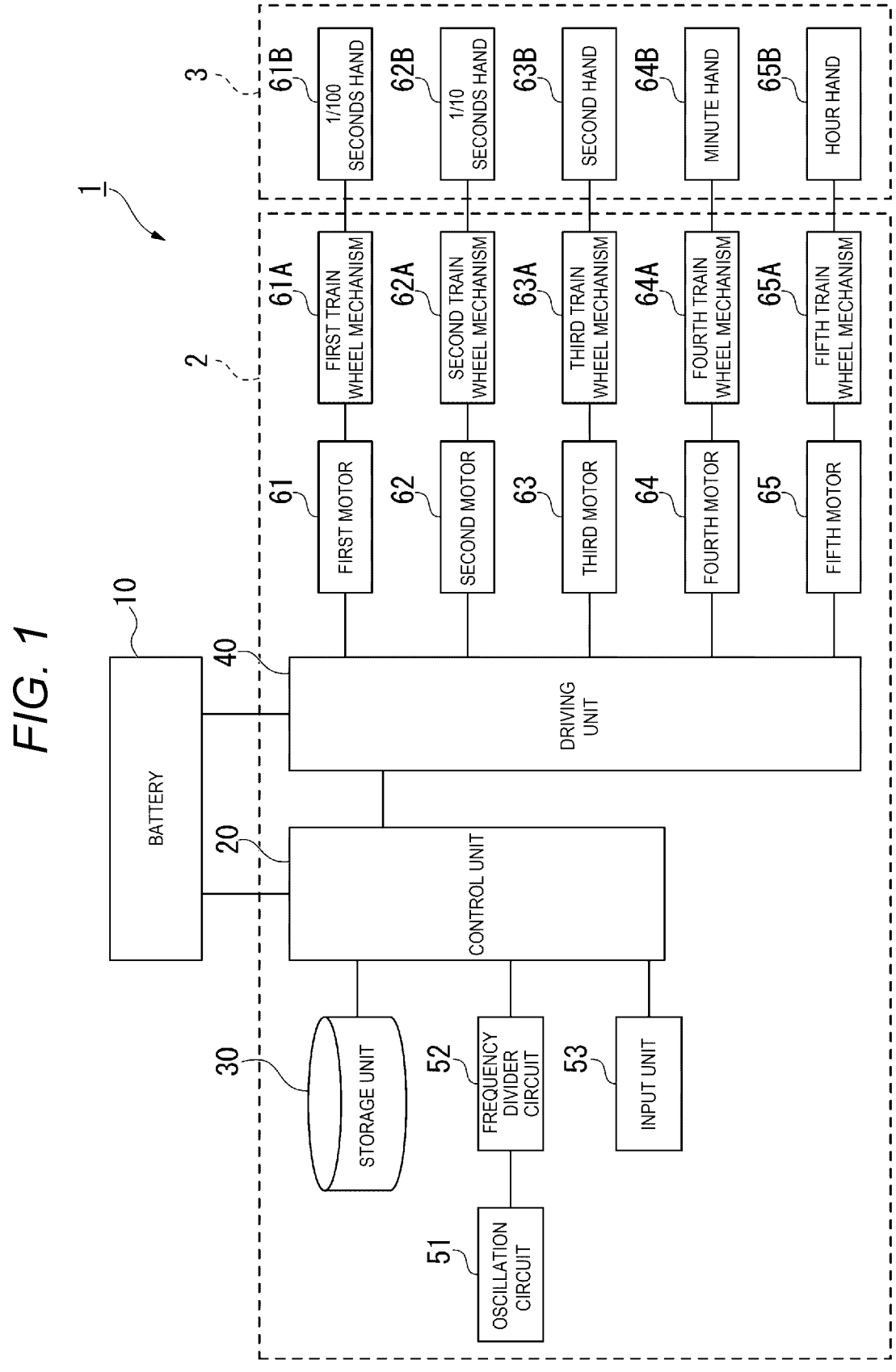
FIG. 1 is a block diagram showing a functional configuration of a watch according to an embodiment.

FIG. 1 is a block diagram showing a functional configuration of a watch according to an embodiment. An example of a functional configuration of a watch 1 will be described with reference to FIG. 1. The watch 1 includes a battery 10, a control unit 20, a storage unit 30, a driving unit 40, an oscillation circuit 51, a frequency divider circuit 52, an input unit 53, a first motor 61, a first train wheel mechanism 61A, a $\frac{1}{100}$ seconds hand 61B, a second motor 62, a second train wheel mechanism 62A, a $\frac{1}{10}$ seconds hand 62B, a third motor 63, a third train wheel mechanism 63A, a 1 second hand 63B, a fourth motor 64, a fourth train wheel mechanism 64A, a minute hand 64B, a fifth motor 65, a fifth train wheel mechanism 65A, and an hour hand 65B.

In the following description, the $\frac{1}{100}$ seconds hand 61B, the $\frac{1}{10}$ seconds hand 62B, the 1 second hand 63B, the minute hand 64B, and the hour hand 65B may be simply referred to as a hand 3 without distinguishing them. In addition, in the functional configuration included in the watch 1 described above, a configuration excluding the battery 10 and the hand 3 may be referred to as a movement 2. In the movement 2, a configuration including at least the control unit 20 and the storage unit 30 may be referred to as a stepping motor control device. The watch 1 may include a case, a windshield, a dial, a scale ring, a strap, and the like (not shown).

The watch 1 clocks time and displays the clocked time using the hand 3. The watch 1 may receive information related to the time through a wireless communication unit (not shown) and display the received time. The watch 1 may achieve a timer function, a stopwatch function, a compass function, and the like by controlling the hand 3.

The battery 10 may be, for example, a lithium battery, or a so-called button battery. The battery 10 supplies power to the movement 2. Specifically, the battery 10 supplies power for driving a logic circuit to the control unit 20, and supplies power for driving a device such as a motor to the driving unit 40. The battery 10 may be a storage battery (secondary battery) that stores power generated by a solar cell.

The oscillation circuit 51 includes, for example, a crystal oscillator. The crystal oscillator is a passive element used for oscillating a first frequency from mechanical resonance thereof by using a piezoelectric phenomenon of crystal. An oscillation frequency of the crystal oscillator is, for example, 32 kHz. The oscillation circuit 51 outputs a clock signal generated by oscillating the crystal oscillator to the frequency divider circuit 52.

The frequency divider circuit 52 divides a frequency of the clock signal output from the oscillation circuit 51 to a desired frequency to generate a reference signal. The frequency divider circuit 52 outputs the reference signal obtained as a result of frequency division to the control unit 20. A frequency of the reference signal generated by the frequency divider circuit 52 may be, for example, 64 Hz and 32 Hz.

The input unit 53 includes, for example, a crown and a push button. The input unit 53 detects an operation of a user and outputs the detected operation result to the control unit 20. A detection result of the crown may be a rotation angle of the crown or the like. A detection result of the push button may be an ON state or an OFF state. An operation mode of the watch 1 may be switched by operating the crown or the push button.

The storage unit 30 includes, for example, a read only memory (ROM) and a random access memory (RAM), which are not shown. The storage unit 30 stores information, a program, and the like necessary for controlling the watch 1. The information necessary for controlling the watch 1 may be, for example, information on a driving pulse output to drive the motor. The driving pulse may be different for each motor. For example, the storage unit 30 stores a pulse width of a first driving pulse that is a pulse for driving the first motor 61, a pulse width of a second driving pulse that is a pulse for driving the second motor 62, a pulse width of a third driving pulse that is a pulse for driving the third motor 63, a pulse width of a fourth driving pulse that is a pulse for driving the fourth motor 64, and a pulse width of a fifth driving pulse that is a pulse for driving the fifth motor 65, respectively.

In addition, the storage unit 30 stores, as information necessary for controlling the watch 1, an upper limit value of the number of motors that can be driven simultaneously in the watch 1. The watch 1 limits a value of a peak current by limiting the number of motors that can be driven simultaneously, thereby preventing a terminal voltage of a battery from decreasing. The upper limit value of the number of motors that can be driven simultaneously may be, for example, two. When it is required to drive the motors equal to or greater than the upper limit value, driving of the motors may be controlled according to a prescribed priority order. In this case, the storage unit 30 may store the priority order for each of the plurality of motors.

The control unit 20 includes, for example, a central processing unit (CPU). The control unit 20 controls each unit included in the watch 1. The control unit 20 controls each unit using power supplied from the battery 10. The control unit 20 clocks time. The control unit 20 controls movement of the hand 3 by controlling each motor based on the clocked result.

Specifically, the control unit 20 controls each motor separately and independently by outputting a driving pulse corresponding to the motor to the driving unit 40. In the following description, a pulse that drives the first motor 61 is referred to as the first driving pulse, a pulse that drives the second motor 62 is referred to as the second driving pulse, a pulse that drives the third motor 63 is referred to as the third driving pulse, a pulse that drives the fourth motor 64 is referred to as the fourth driving pulse, and a pulse that drives the fifth motor 65 is referred to as the fifth driving pulse. In other words, the control unit 20 controls the driving unit to drive the first motor 61 by outputting the first driving pulse, drive the second motor 62 by outputting the second driving pulse, drive the third motor 63 by outputting the third driving pulse, drive the fourth motor 64 by outputting the fourth driving pulse, and drive the fifth motor 65 by outputting the fifth driving pulse.

The control unit 20 may include a battery voltage detector (not shown). The battery voltage detector monitors a terminal voltage of the battery 10. The control unit 20 may stop driving the motor when a voltage detected by the battery voltage detector is equal to or lower than a prescribed value. The control unit 20 may restart the driving of the motor when the voltage detected by the battery voltage detector recovers to the prescribed value or more after the driving of the motor stops. Drive stop control of the motor by the battery voltage detector is for responding to an emergency. The stepping motor control device according to the present embodiment controls an output timing of a driving pulse so that the terminal voltage of the battery 10 does not fall below a minimum operating voltage during normal use.

The driving unit 40 drives a plurality of motors including at least two motors (for example, the first motor 61 and the second motor 62). In the shown example, the driving unit 40 drives the first motor 61, the second motor 62, the third motor 63, the fourth motor 64, and the fifth motor 65. Specifically, the driving unit 40 may include a motor driving circuit such as an H-bridge.

The first motor 61, the second motor 62, the third motor 63, the fourth motor 64, and the fifth motor 65 are all stepping motors. The first motor 61 drives the $1/100$ seconds hand 61B via the first train wheel mechanism 61A in response to the first driving pulse output from the control unit 20. The second motor 62 drives the $1/10$ seconds hand 62B via the second train wheel mechanism 62A in response to the second driving pulse output from the control unit 20. The third motor 63 drives the 1 second hand 63B via the third train wheel mechanism 63A in response to the third driving pulse output from the control unit 20. The fourth motor 64 drives the minute hand 64B via the fourth train wheel mechanism 64A in response to the fourth driving pulse output from the control unit 20. The fifth motor 65 drives the hour hand 65B via the fifth train wheel mechanism 65A in response to the fifth driving pulse output from the control unit 20.

Each of the first train wheel mechanism 61A, the second train wheel mechanism 62A, the third train wheel mechanism 63A, the fourth train wheel mechanism 64A, and the fifth train wheel mechanism 65A (hereinafter, when each of the train wheel mechanisms is not distinguished, the train wheel mechanisms may be simply referred to as a train wheel mechanism) includes at least one gear. The train wheel mechanism transmits power output from the motor to the hand 3 to move the hand 3.

Figure 2:
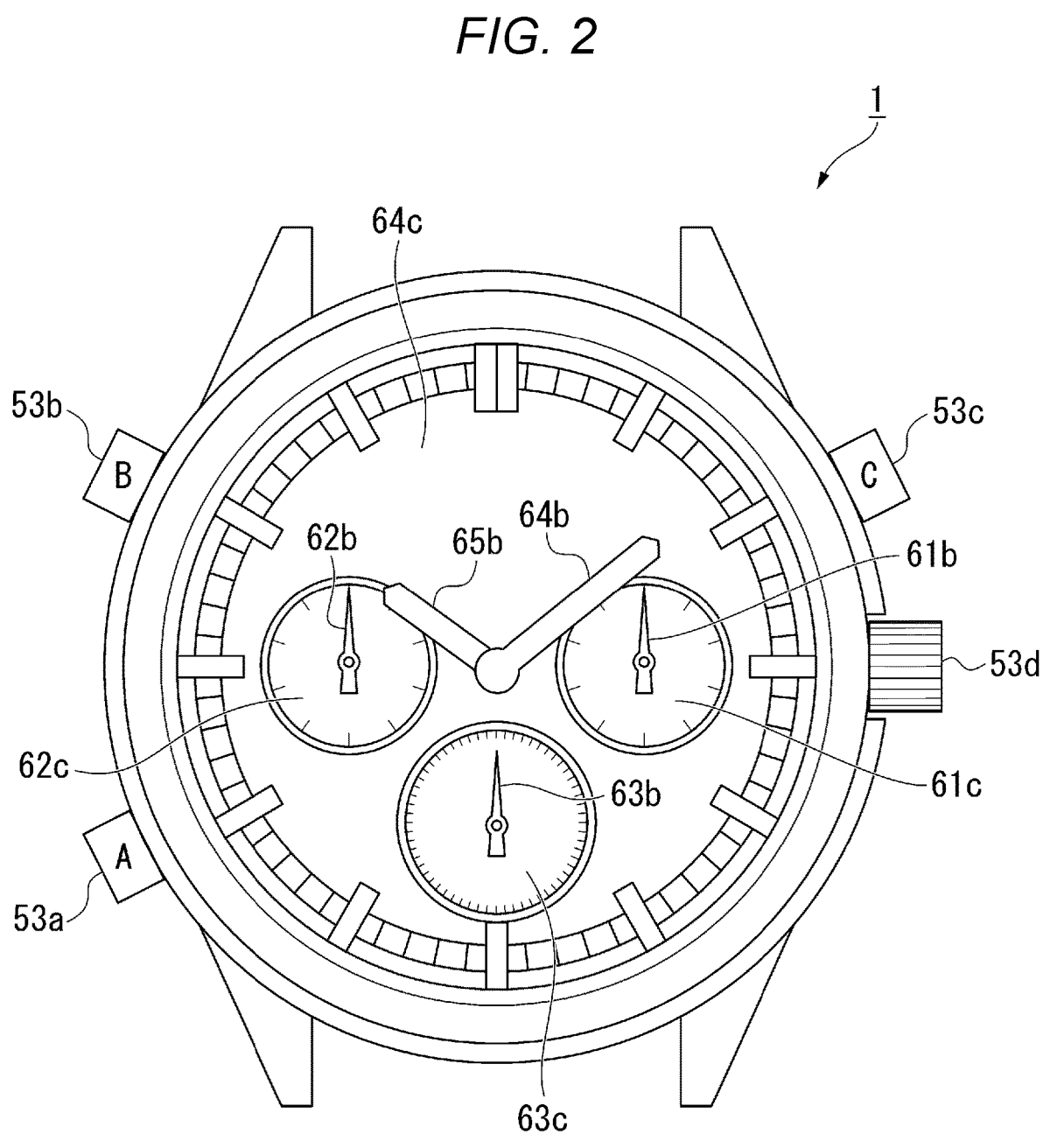

FIG. 2 is a diagram showing an arrangement example of the $1/100$ seconds hand, the $1/10$ seconds hand, a second hand, a minute hand, and an hour hand of the watch according to the present embodiment. An example of arrangement of the $1/100$ seconds hand 61B, the $1/10$ seconds hand 62B, the 1 second hand 63B, the minute hand 64B, and the hour hand 65B will be described with reference to FIG. 2.

As shown in the figure, the watch 1 includes a push button 53*a*, a push button 53*b*, a push button 53*c*, and a crown 53*d* as the input unit 53. The push button 53*a* is used for switching the operation mode. The push button 53*b* is used for RESET, LAP/SPLIT, and the like when the stopwatch function is used. The push button 53*c* is used for START, STOP, and the like when the stopwatch function is used. The crown 53*d* is used, for example, for adjustment of time setting. In addition, the push button 53*a*, the push button 53*b*, the push button 53*c*, and the crown 53*d* may be used for various inputs or the like in each operation mode.

In addition, the watch 1 includes, as a display unit, the $\frac{1}{100}$ seconds hand 61B, a first dial 61C, the $\frac{1}{10}$ seconds hand 62B, a second dial 62C, the 1 second hand 63B, a third dial 63C, the minute hand 64B, a fourth dial 64C, and the hour hand 65B.

The minute hand 64B and the hour hand 65B are moved during normal time display, and display time using a memory displayed on an outer periphery of the fourth dial 64C. The $\frac{1}{100}$ seconds hand 61B, the first dial 61C, the $\frac{1}{10}$ seconds hand 62B, the second dial 62C, the 1 second hand 63B, and the third dial 63C are driven in a stopwatch mode or the like. A memory in units of $\frac{1}{100}$ seconds is displayed on an outer periphery of the first dial 61C, and a measurement result in units of $\frac{1}{100}$ seconds is displayed by driving the $\frac{1}{100}$ seconds hand 61B. A memory in units of $\frac{1}{10}$ seconds is displayed on an outer periphery of the second dial 62C, and a measurement result in units of $\frac{1}{10}$ seconds is displayed by driving the $\frac{1}{10}$ seconds hand 62B. A memory in units of 1 second is displayed on an outer periphery of the third dial 63C, and a measurement result in units of 1 second is displayed by driving the 1 second hand 63B.

Figure 3:
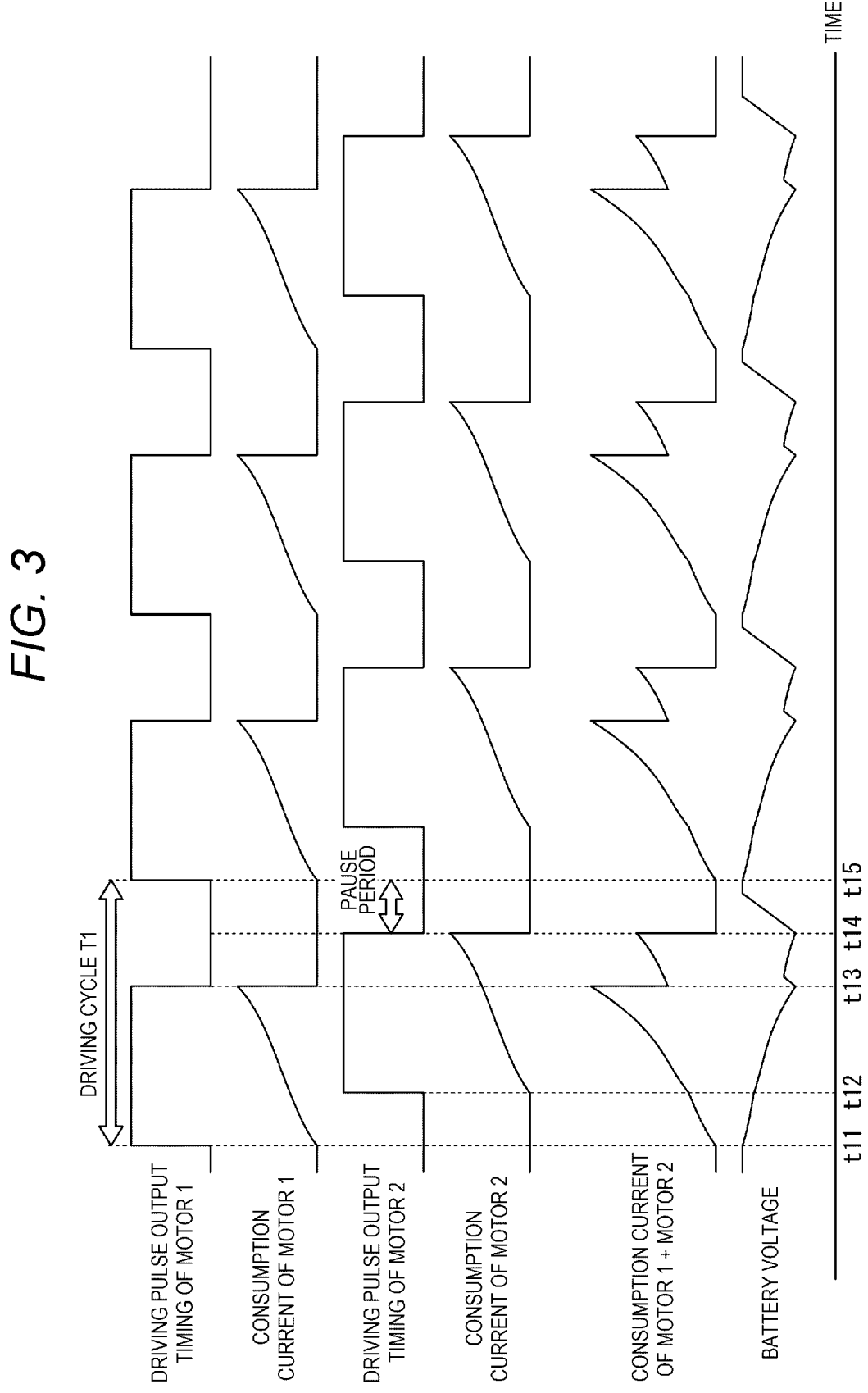
FIG. 3 is a diagram showing an example of a driving pulse by a stepping motor control method according to the present embodiment.

FIG. 3 is a diagram showing an example of a driving pulse by a stepping motor control method according to the present embodiment. A motor control method by the control unit 20 according to the present embodiment will be described with reference to FIG. 3. FIG. 3 shows an example in which two motors, that is, the motor 1 and the motor 2 are simultaneously controlled. Specifically, the motor 1 may be the first motor 61 that moves the $\frac{1}{100}$ seconds hand 61B, and the motor 2 may be any one of the second motor 62 to the fifth motor 65. In the following description, an example in which the motor 1 is the first motor 61 and the motor 2 is the second motor 62 will be described. In FIG. 3, an output timing of a driving pulse output to each motor, a consumption current of each motor, a total value of consumption currents of the two motors, and a value of the terminal voltage of the battery 10 are shown with a horizontal axis representing time.

At t11, the first driving pulse that drives the first motor 61 is output. A driving cycle of the first motor 61 is shown as a driving cycle T1. The driving cycle T1 may be, for example, 5 [ms]. In the shown example, a driving cycle of the second motor 62 is the same as the driving cycle of the first motor 61. Driving cycles of the motors other than the first motor 61 (that is, the second motor 62, the third motor 63, the fourth motor 64, and the fifth motor 65) are preferably the same as or an integral multiple of the driving cycle of the first motor 61. In the present embodiment, the watch 1 drives the hands at a high speed. Specifically, as a result of shortening the driving cycle due to high-speed driving, a sum of the pulse width of the first driving pulse that drives the first motor 61 and a pulse width of a driving pulse (for example, the second driving pulse in a case of the second motor 62) that drives a motor other than the first motor 61 is longer than the driving cycle T1 which is the driving cycle of the first motor 61.

At t12, the second driving pulse that drives the second motor 62 is output. Here, in order to prevent the peak current and prevent a decrease in the terminal voltage of the battery 10, it is preferable not to simultaneously output driving pulses. Also in the shown example, there is a prescribed time after the first driving pulse is output until the second driving pulse is output. The time may be stored in the storage unit 30. That is, it can be said that the storage unit 30 stores the prescribed time after the first driving pulse is output until the second driving pulse is output. The control unit 20 outputs the second driving pulse after the prescribed time stored in the storage unit 30 elapses after the first driving pulse is output.

Here, the first motor 61 starts to consume a current at t11, and the second motor 62 starts to consume a current at t12. Therefore, after t11 and t12, the terminal voltage of the battery 10 decreases.

At t13, output of the first driving pulse of the first motor 61 is stopped. Therefore, a consumption current of the first motor 61 after t13 theoretically becomes zero. At t14, output of the second driving pulse of the second motor 62 is stopped. Therefore, a consumption current of the second motor 62 after t14 theoretically becomes zero. At t15, the next driving cycle is started.

As shown in the figure, according to the motor control method according to the present embodiment, in order to drive the hands at a high speed, there is a place where driving pulses of two motors temporally overlap. As a result of high-speed driving, when a sum of the pulse width of the first driving pulse and the pulse width of the second driving pulse is longer than the driving cycle T1 which is the driving cycle of the first motor 61, in the driving cycle of the first motor 61, a part of the first driving pulse and at least a part of the second driving pulse are simultaneously output.

As shown in the figure, according to the motor control method according to the present embodiment, in the driving cycle T1, a pause period in which no driving pulse is output to any motor is provided. It can be said that the pause period is a period in which neither the first driving pulse nor the second driving pulse is output after the first driving pulse and the second driving pulse are output and before a start timing of the next driving cycle of the first motor 61. Due to presence of the pause period, even after the terminal voltage of the battery 10 temporarily decreases, the terminal voltage can be recovered to a prescribed voltage at start of the next cycle. That is, due to the presence of the pause period, even when the hands are driven at a high speed, it is possible to prevent the terminal voltage of the battery 10 from gradually decreasing.

Figure 4:
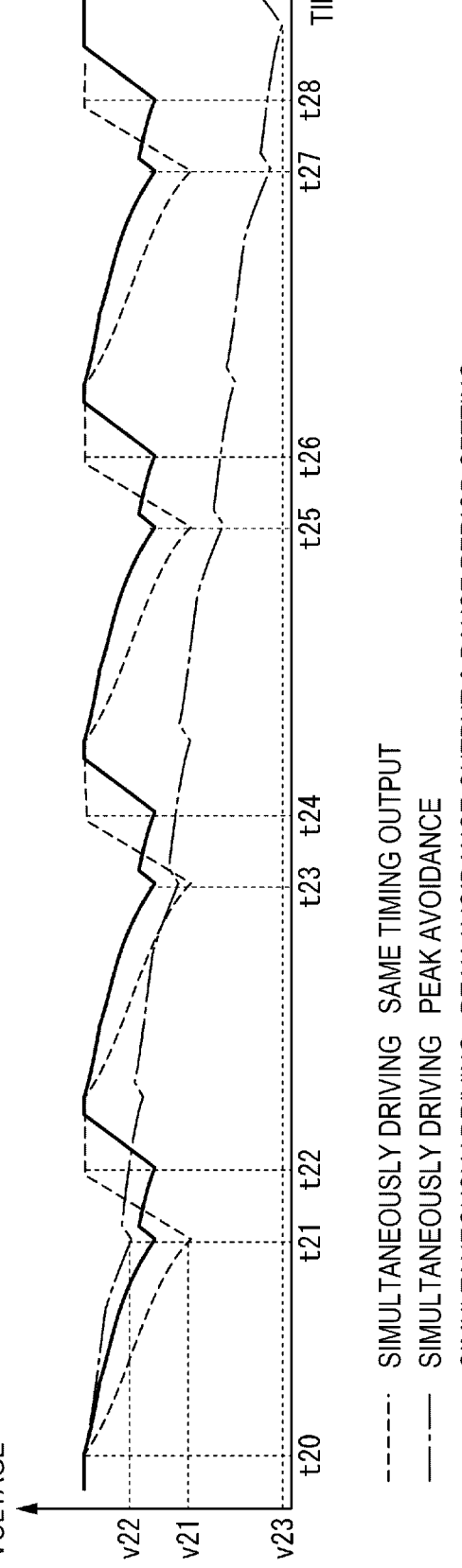
FIG. 4 is a diagram showing an example of a voltage decrease by the stepping motor control method according to the present embodiment.

FIG. 4 is a diagram showing an example of a voltage decrease by the stepping motor control method according to the present embodiment. An example of a voltage decrease when a motor control method is changed will be described with reference to FIG. 4. FIG. 4 shows an example of a voltage decrease when each of three motor control methods is performed.

As a first example, an example in which two motors are driven simultaneously and driving pulses are output at the same timing is shown. A voltage change in the first example is indicated by a broken line. When the driving pulses are output at the same timing, peak currents in the two motors overlap, and a decrease amount of a voltage thereof becomes remarkable. Specifically, at t20, the two motors are turned on at the same timing, and the voltage starts to decrease. At t21, output of the driving pulses ends, and the voltage starts to recover. Here, according to the first example, the voltage decreases to v21 at a time point t21 when the output of the driving pulses ends. Therefore, a second example is to avoid overlapping of the peak currents by turning on the motors at different timings.

As the second example, an example in which the two motors are driven simultaneously, but the driving pulses are output at different timings to reduce the decrease amount of the voltage is shown. A voltage change in the second example is indicated by a dash-dotted line. By outputting the driving pulses at different timings, the overlapping of the peak currents in the two motors can be avoided, and the decrease amount of the voltage can be reduced. In the shown example, the decrease amount of the voltage is reduced to v22. However, according to this example, since no pause period according to the present embodiment is provided, one of the two motors is normally driven. Therefore, as the high-speed driving continues without voltage recovering, the terminal voltage of the battery 10 gradually decreases. In the shown example, after t28, the voltage decreases to v23. As the voltage gradually decreases in this way, the voltage may eventually fall below the minimum operating voltage of the control unit 20, and an abnormal operation may occur. Here, the pause period is provided in the motor control method according to the present embodiment. The motor control method according to the present embodiment will be described as a third example.

As the third example, an example in which two motors are driven simultaneously, but driving pulses are output at different timings, and further, the pause period is provided to reduce a decrease amount of a voltage is shown. A voltage change in the third example is indicated by a solid line. According to the third example, by providing the pause period, overlapping of the two driving pulses increases. Therefore, when the decrease amount of the voltage in the third example is compared with the decrease amount of the voltage in the second example, in one driving cycle, the decrease amount of the voltage in the third example is larger. However, since the next driving cycle is entered after the terminal voltage of the battery 10 is recovered, the decrease amount of the voltage in the third example is smaller in a long-term view.

Figure 5:
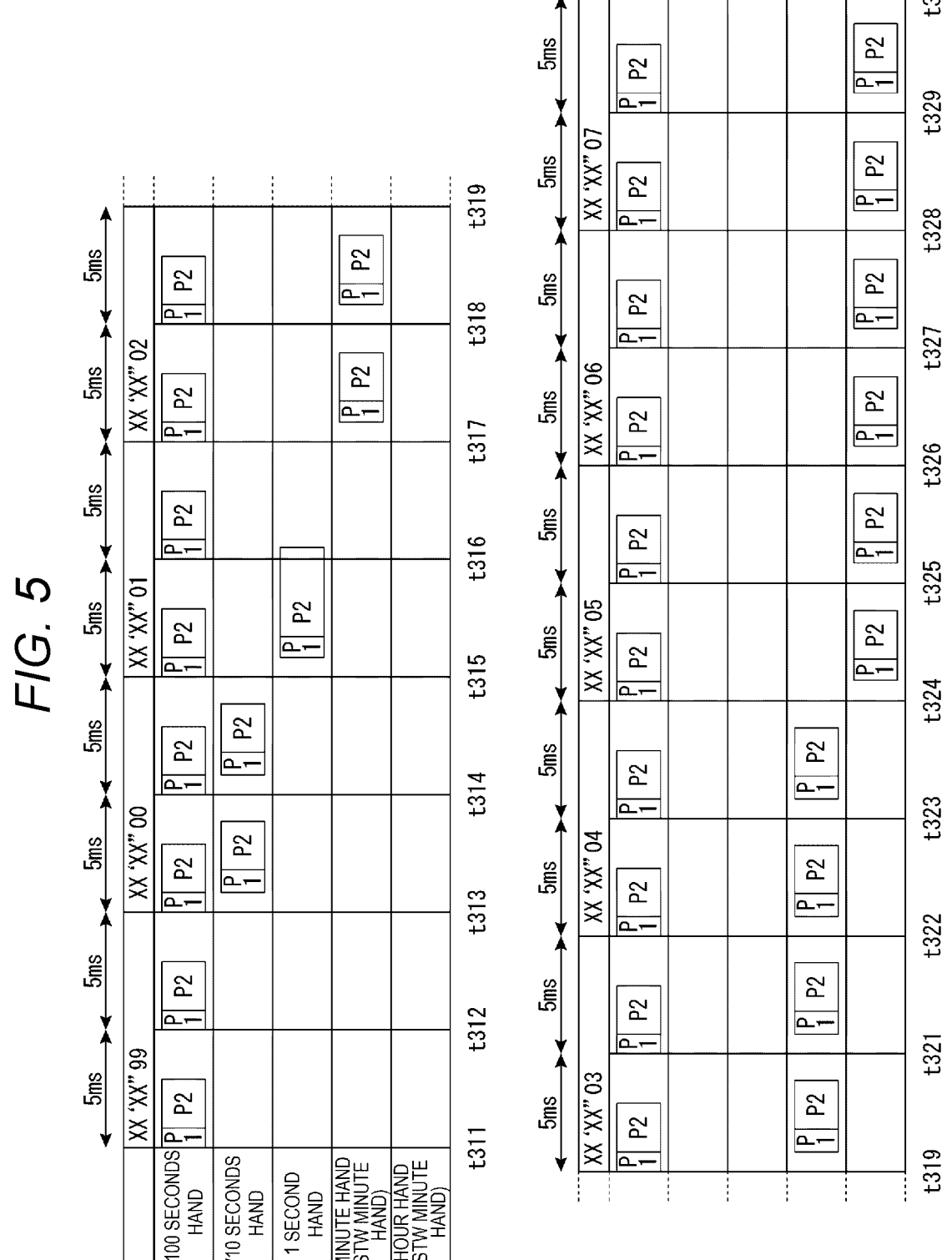
FIG. 5 is a diagram showing a first specific example of motor driving by the stepping motor control method according to the present embodiment.
Figure 6:
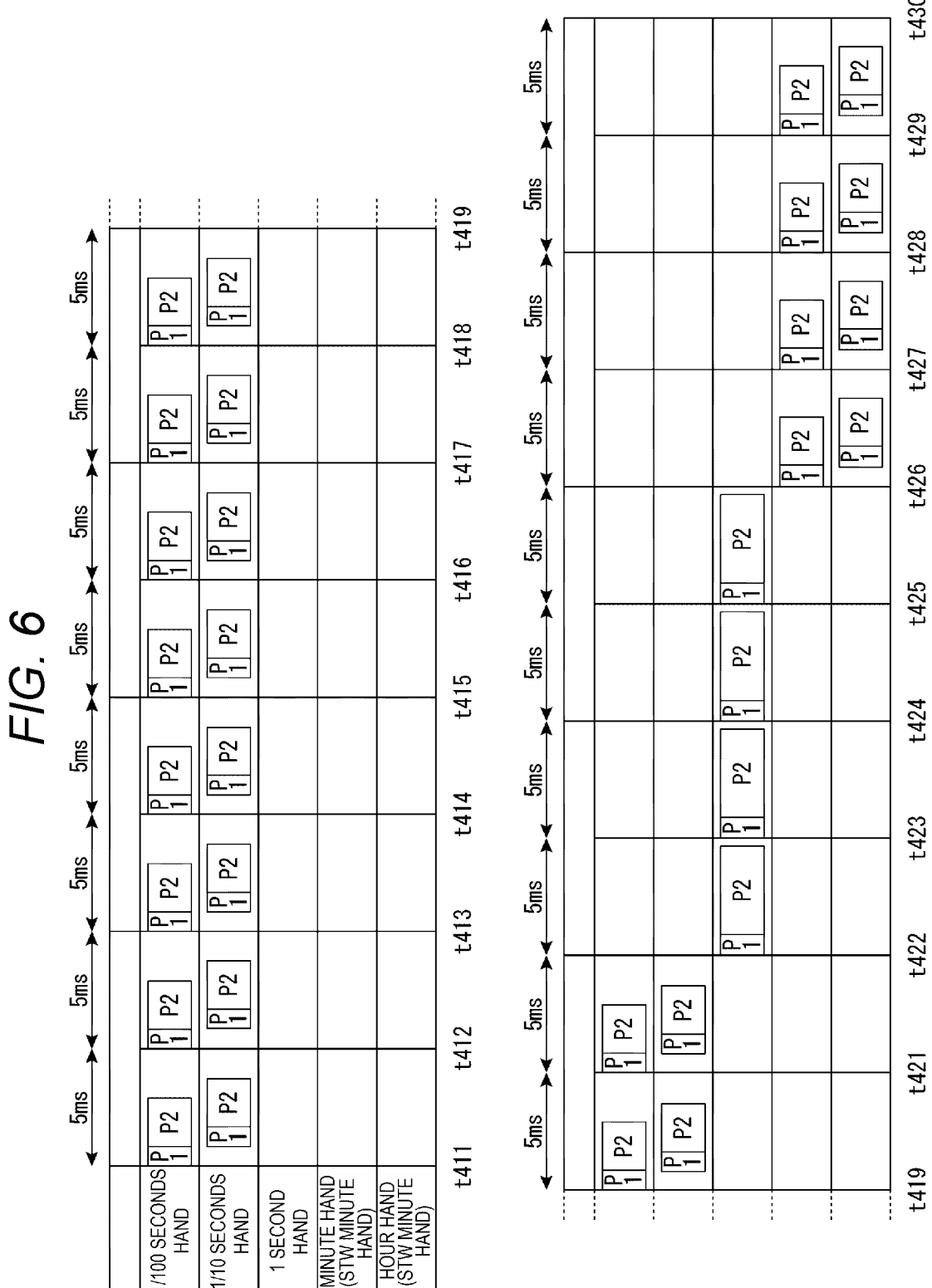
FIG. 6 is a diagram showing a second specific example of the motor driving by the stepping motor control method according to the present embodiment.

Next, a specific example of driving the first motor 61 to the fifth motor 65 by the control unit 20 will be described with reference to FIGS. 5 and 6. In FIGS. 5 and 6, a horizontal axis represents time, and drive timings of the first motor 61 to the fifth motor 65 are shown. As shown in the figure, one driving pulse includes a first pulse P1 and a second pulse P2. The present embodiment is not limited to this example, and a driving pulse may be one pulse.

FIG. 5 is a diagram showing a first specific example of motor driving by the stepping motor control method according to the present embodiment. The first specific example will be described with reference to FIG. 5. The first specific example shows a per-exact minute timing (that is, a timing at which all the hands move) during chronograph movement. The control unit 20 drives the first motor 61 by outputting the first driving pulse at a cycle of 5 [ms]. As shown in the figure, the first driving pulse is output in all the driving cycles. When the number of motors that can be driven simultaneously is two, since the first motor 61 is driven in all the driving cycles, any one of the second motor 62 to the fifth motor 65 is exclusively driven in order. In the shown example, the first driving pulse is output simultaneously with start of the driving cycles. From t311 to t312, only the first motor 61 is driven.

From t313 to t315, the first motor 61 is driven by outputting the first driving pulse, and the second motor 62 is driven by outputting the second driving pulse. As shown in the figure, the second driving pulse is output after a prescribed time elapses after the first driving pulse is output. The prescribed time may be the same as that of the first pulse P1 of the first driving pulse. A pause period is provided between the output of the second driving pulse and start of the next driving cycle.

From t316 to t317, the first motor 61 is driven by outputting the first driving pulse, and the third motor 63 is driven by outputting the third driving pulse. As shown in the figure, the third driving pulse is output after a prescribed time elapses after the first driving pulse is output. The third driving pulse is longer than the other driving pulses, and cannot be terminated within one driving cycle. Therefore, in such a case, a pause period is further provided until the start of the next driving cycle. A length of the driving pulse varies depending on a size, a weight, a shape, a material, and the like of the hand 3 and the train wheel mechanism.

Similarly to the control described above, from t317 to t324, the first motor 61 is driven by outputting the first driving pulse, and the fourth motor 64 is driven by outputting the fourth driving pulse. From t324 to t330, the fifth motor 65 is driven by outputting the fifth driving pulse.

Here, the control unit 20 may be desired to drive simultaneously a plurality of motors, exceeding the upper limit value of the number of motors to be driven simultaneously. For example, when the upper limit value of the number of motors that can be driven simultaneously stored in the storage unit 30 is two, three or more motors may be desired to be driven simultaneously. In such a case, the control unit 20 may perform control according to the priority order stored in the storage unit 30. In other words, it can be said that when the number of motors to be driven simultaneously exceeds the upper limit value, the control unit 20 drives a motor having a highest priority order, and drives a motor having a second highest priority order after the motor having the highest priority order is stopped. In the shown example, the priority order is the first motor 61, the second motor 62, the third motor 63, the fourth motor 64, and the fifth motor 65 in descending order.

FIG. 6 is a diagram showing a second specific example of the motor driving by the stepping motor control method according to the present embodiment. The second specific example will be described with reference to FIG. 6. The second specific example is different from the first specific example in that a period in which the first driving pulse is not output is provided. The second specific example specifically shows a movement example at the time of mode transition. After a chronograph mode ends, two motors are sequentially driven, for example, when all hands return to a zero position from a prescribed hand position. In the shown example, only the 1 second hand 63B is driven independently, but this is implemented in consideration of appearance from arrangement of the dial.

From t411 to t422, the first motor 61 and the second motor 62 are driven by outputting the first driving pulse and the second driving pulse. After t422, the output of the first driving pulse and the second driving pulse is stopped. Next, from t422 to t426, the third motor 63 is driven by outputting the third driving pulse. From t426 to t430, the fourth motor 64 and the fifth motor 65 are driven by outputting the fourth driving pulse and the fifth driving pulse.

In this way, the control unit 20 operates prescribed motors in combination. After the operation of the combined motors ends, the control unit 20 drives a next combination of motors. In the shown example, the first motor 61 and the second motor 62 form a first group, and the fourth motor 64 and the fifth motor 65 form a second group. Here, it is preferable that driving frequencies of the motors in the same group be the same. In the shown example, the first motor 61 and the second motor 62 have the same driving frequency, and the fourth motor 64 and the fifth motor 65 have the same driving frequency.

FIG. 7 is a diagram showing an example of a driving priority order according to the present embodiment. The driving priority order of motors will be described with reference to FIG. 7. The shown table may be stored in the storage unit 30. In the shown example, the first motor 61 is set to have the highest priority order. The driving priority order is, in descending order, a motor that drives the ¹⁄₁₀₀ seconds hand 61B (that is, the first motor 61), a motor that drives the ¹⁄₁₀ seconds hand 62B (that is, the second motor 62), a motor that drives the 1 second hand 63B (that is, the third motor 63), a motor that drives the minute hand 64B (that is, the fourth motor 64), and a motor that drives the hour hand 65B (that is, the fifth motor 65). For example, a hand that measures ¹⁄₁₀₀ seconds and a hand that measures 1 second have different weights when the two hands are shifted by one driving cycle (5 [ms]). Thus, by increasing a priority of a motor having a high driving frequency, an error at the time of clocking can be minimized.

In the present embodiment, it can be said that the control unit 20 drives a plurality of motors having different measurement units. In this case, it can be said that the priority order is set according to the measurement units of the motors. More specifically, it can be said that a priority order of a motor having a small measurement unit is higher than a priority order of a motor having a large measurement unit.

FIG. 8 is a diagram showing an example of the number of driving steps according to the present embodiment. The number of driving steps required for the hand 3 to make one rotation will be described with reference to FIG. 8. As shown, in order for the ¹⁄₁₀₀ seconds hand 61B to make one rotation, the first motor 61 requires 20 steps. In order for the ¹⁄₁₀ seconds hand 62B to make one rotation, the second motor 62 requires 20 steps. In order for the 1 second hand 63B to make one rotation, the third motor 63 requires 60 steps. In order for the minute hand 64B to make one rotation, the fourth motor 64 requires 360 steps. In order for the hour hand 65B to make one rotation, the fifth motor 65 requires 360 steps.

FIG. 9 is a diagram showing an example of a maximum driving frequency according to the present embodiment. The maximum driving frequency of each motor will be described with reference to FIG. 9. As shown in the figure, a maximum driving frequency of the first motor 61 is 200 [Hz], a maximum driving frequency of the second motor 62 is 200 [Hz], a maximum driving frequency of the third motor 63 is 100 [Hz], a maximum driving frequency of the fourth motor 64 is 200 [Hz], and a maximum driving frequency of the fifth motor 65 is 200 [Hz]. The first motor 61, the second motor 62, the fourth motor 64, and the fifth motor 65 can be driven at 200 [Hz]. In other words, these motors can be driven by one step in one driving cycle (5 [ms]). Meanwhile, the third motor 63 can be driven at 100 [Hz]. In other words, driving by one step requires two driving cycles (10 [ms]). As described above, when there are motors having different maximum driving frequencies, it is preferable to drive a combination of motors that can be driven at the same driving frequency.

A length of a driving pulse necessary to move the hands 3 varies depending on a size, a weight, a shape, a material, and the like of the hand 3 and the train wheel mechanism. A maximum driving frequency may be determined according to the length of the driving pulse and a driving cycle.

Next, an example of operations related to a stopwatch clocking process of the watch 1 will be described with reference to FIGS. 10 to 16. In an example of a process to be described below, an example of a case where two pulses, that is, the first pulse P1 and the second pulse P2 are used as a driving pulse that drives a motor by one step will be described. A length of the first pulse P1 is smaller than a length of the second pulse P2. The present embodiment is not limited to this example, and the motor can be driven by one step by a single pulse (for example, one pulse obtained by adding the first pulse P1 and the second pulse P2).

Figure 10:
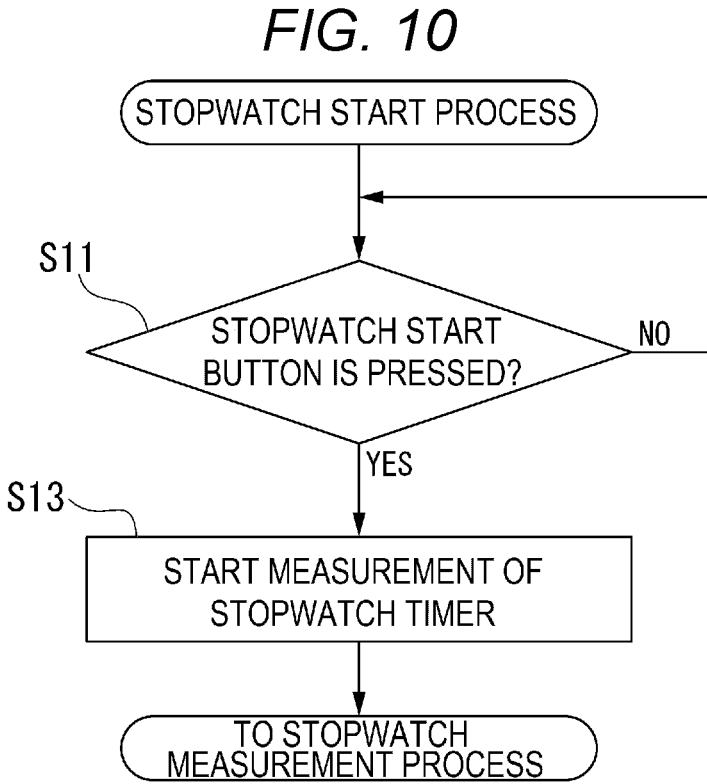
FIG. 10 is a first flowchart showing an example of a stopwatch clocking process of the watch according to the present embodiment.

FIG. 10 is a first flowchart showing an example of the stopwatch clocking process of the watch according to the present embodiment. First, an example of a stopwatch start process will be described with reference to FIG. 10.

The control unit 20 determines whether a stopwatch button is pressed (step S11). Whether the stopwatch button is pressed may be determined based on, for example, whether the push button 53a is pressed, or the number of times the push button 53a is pressed. When the stopwatch button is pressed, the control unit 20 starts to measure a stopwatch timer (step S13). A measurement process of the stopwatch timer (stopwatch clocking process) will be described in detail with reference to FIG. 11.

Figure 11:
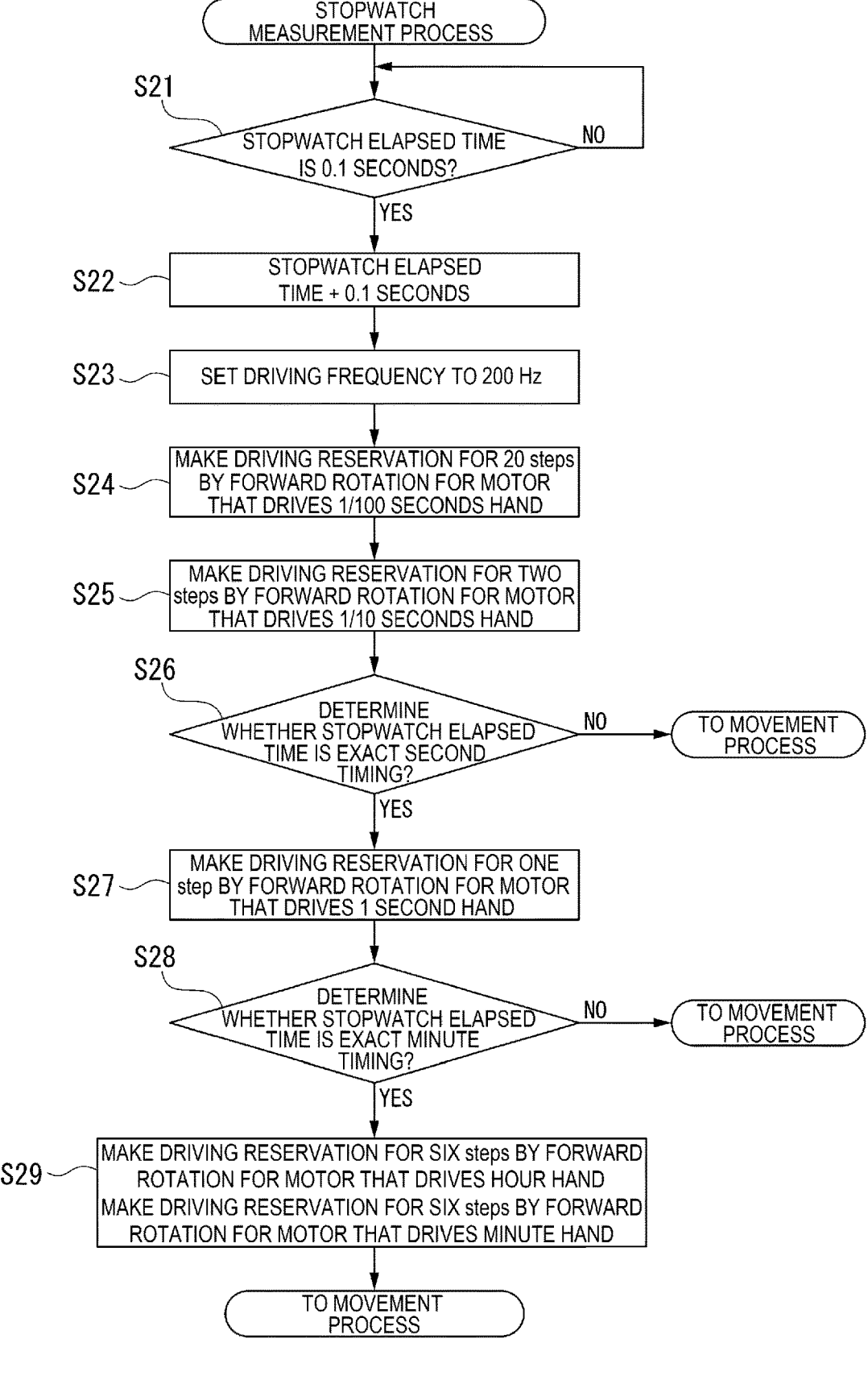
FIG. 11 is a second flowchart showing an example of a stopwatch clocking process of the watch according to the present embodiment.

FIG. 11 is a second flowchart showing an example of a stopwatch clocking process of the watch according to the present embodiment. An example of the stopwatch clocking process will be described with reference to FIG. 11.

The control unit 20 monitors a stopwatch elapsed time (step S21), and sets a driving frequency of the first motor 61 (step S23) when the stopwatch elapsed time is 0.1 seconds (step S22). A driving frequency of a motor may be stored in the storage unit 30, for example. In the shown example, the driving frequency of the first motor 61 is 200 [Hz]. The control unit 20 makes a driving reservation for 20 steps by forward rotation for the first motor 61 that moves the ¹⁄₁₀₀ seconds hand 61B (step S25).

Next, the control unit 20 monitors the stopwatch elapsed time and determines whether the stopwatch elapsed time is an exact second timing (step S26). If the stopwatch elapsed time is not the exact second timing, the control unit 20 advances the process to a movement process to be described with reference to FIG. 12. If the stopwatch elapsed time is the exact second timing, the control unit 20 makes a driving reservation for one step by forward rotation for the third motor 63 that moves the 1 second hand 63B (step S27).

Next, the control unit 20 monitors the stopwatch elapsed time and determines whether the stopwatch elapsed time is an exact minute timing (step S28). If the stopwatch elapsed time is not the exact minute timing, the control unit 20 advances the process to the movement process to be described with reference to FIG. 12. If the stopwatch elapsed time is the exact minute timing, the control unit 20 makes a driving reservation for six steps by forward rotation for the fourth motor 64 that moves the minute hand 64B, and makes the driving reservation for six steps by forward rotation for the fifth motor 65 that moves the hour hand 65B (step S29).

Figure 12:
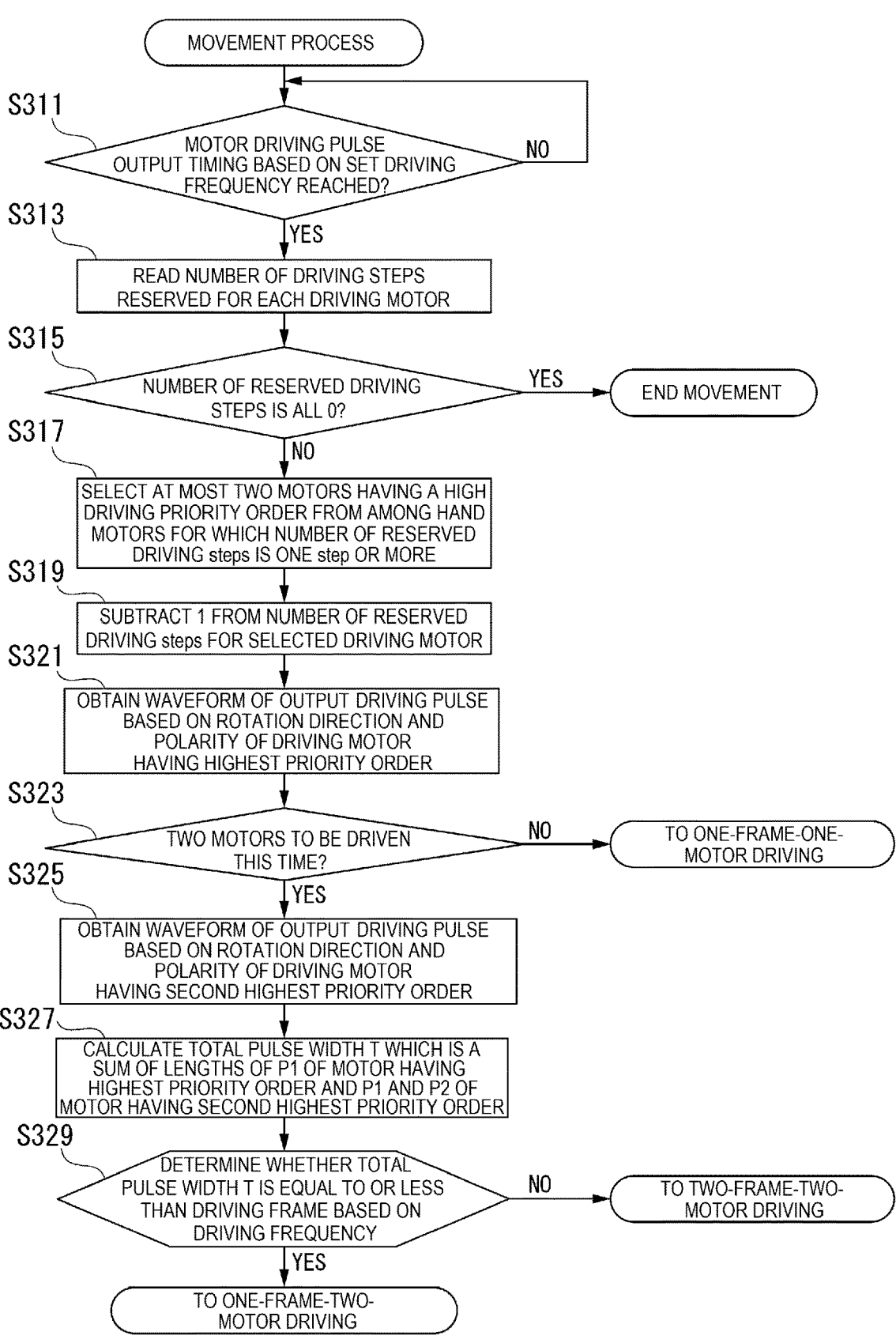
FIG. 12 is a third flowchart showing an example of a stopwatch clocking process of the watch according to the present embodiment.

FIG. 12 is a third flowchart showing an example of a stopwatch clocking process of the watch according to the present embodiment. An example of the movement process will be described with reference to FIG. 12.

The control unit 20 determines whether a motor driving pulse output timing based on the set driving frequency is reached (step S311). If the motor driving pulse output timing based on the set driving frequency is reached, the control unit 20 reads the number of driving steps reserved for each driving motor (step S313). The control unit 20 performs a process according to the number of reserved driving steps (step S313). Specifically, if the number of reserved driving steps is all 0, the control unit 20 ends the movement process. If the number of reserved driving steps is not all 0, the control unit 20 selects at most two motors having a high driving priority order from among hand motors for which the number of reserved driving steps is one step or more. The driving priority order is stored in the storage unit 30.

Next, the control unit 20 subtracts 1 from the number of reserved driving steps for the selected driving motor (step S319). The control unit 20 obtains a waveform of a driving pulse to be output based on a rotation direction, a polarity, and the like of the motor having the highest priority order (step S321). The rotation direction, the polarity, and the like of the motor are stored in the storage unit 30. The polarity is reversed every time one step of driving is performed. The polarity at the time of the next driving may be stored in a RAM area or the like of the storage unit 30 and updated for each step.

Here, the control unit 20 performs different driving processes according to the number of motors to be driven. If the number of motors to be driven is one, the control unit 20 advances the process to a one-frame-one-motor driving process to be described with reference to FIG. 13 (step S323: NO). If the number of motors to be driven is two (step S323: YES), the control unit 20 obtains a waveform of a driving pulse to be output based on a rotation direction, a polarity, and the like of a motor having the second highest priority order (step S325). The rotation direction, the polarity, and the like of the motor are stored in the storage unit 30.

Next, the control unit 20 calculates a value of a total pulse width T which is a sum of lengths of the first pulse P1 of the motor having the highest priority order and the first pulse P1 and the second pulse P2 of the motor having the second highest priority order (step S327). The control unit 20 determines whether the calculated total pulse width T is equal to or less than a driving frame based on the driving frequency (step S329). The driving frame based on the driving frequency is, for example, 5 [ms] when the driving frequency is 200 [Hz]. If the total pulse width T is equal to or less than the driving frame, the control unit 20 advances the process to a one-frame-two-motor driving process to be described with reference to FIG. 14. If the total pulse width T is not equal to or less than the driving frame, the control unit 20 advances the process to a two-frame-two-motor driving process to be described with reference to FIG. 15.

FIG. 13 is a fourth flowchart showing an example of a stopwatch clocking process of the watch according to the present embodiment. An example of the one-frame-one-motor driving process will be described with reference to FIG. 13.

The control unit 20 outputs the first pulse P1 of the motor having the highest priority order (step S41). If output of the first pulse P1 of the motor having the highest priority order ends (step S43), the control unit 20 outputs the second pulse P2 of the motor having the highest priority order (step S45). If output of the second pulse P2 of the motor having the highest priority order ends (step S47), the control unit 20 turns off all the motor output (step S49), and returns the process to the movement process described with reference to FIG. 12.

Figure 14:
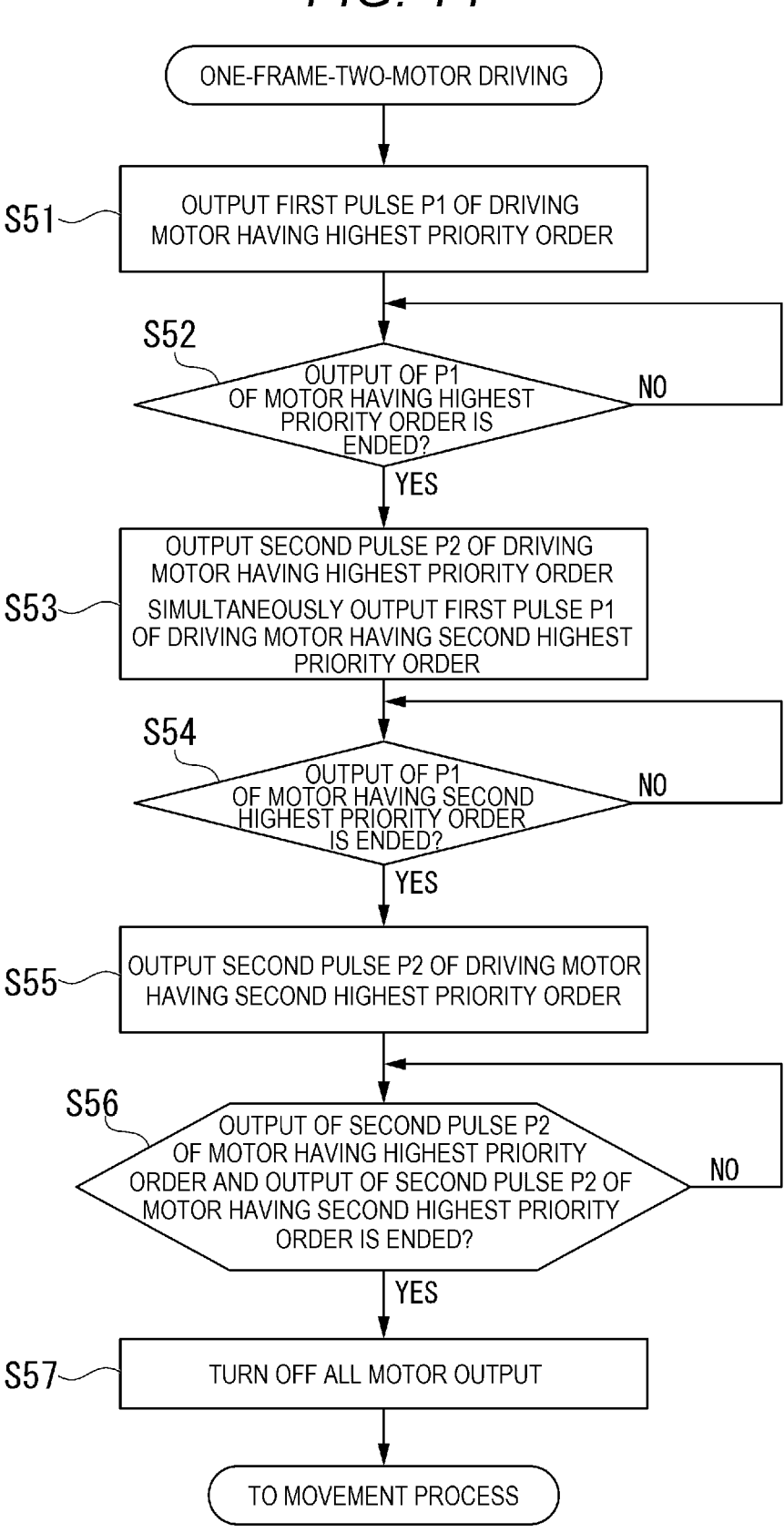
FIG. 14 is a fifth flowchart showing an example of a stopwatch clocking process of the watch according to the present embodiment.

FIG. 14 is a fifth flowchart showing an example of a stopwatch clocking process of the watch according to the present embodiment. An example of the one-frame-two-motor driving process will be described with reference to FIG. 14.

The control unit 20 outputs the first pulse P1 of the motor having the highest priority order (step S51). If the output of the first pulse P1 of the motor having the highest priority order ends (step S52), the control unit 20 outputs the second pulse P2 of the motor having the highest priority order and simultaneously outputs the first pulse P1 of the motor having the second highest priority order (step S53). That is, in the present embodiment, a driving start timing of the two motors that are driven simultaneously is shifted by the first pulse P1 of the motor that is driven first. By shifting the driving start timing in this way, a maximum value of the peak current is reduced. If output of the first pulse P1 of the motor having the second highest priority order ends (step S54), the control unit 20 outputs the second pulse P2 of the motor having the second highest priority order (step S55). At this time, since the second pulse P2 is longer than the first pulse P1, the second pulse P2 of the motor having the highest priority order continues to be output. Next, if the output of the second pulse P2 of the motor having the highest priority order ends and the output of the second pulse P2 of the motor having the second highest priority order ends (step S56), the control unit 20 turns off all the motor output (step S57) and returns the process to the movement process described with reference to FIG. 12.

Figure 15A:
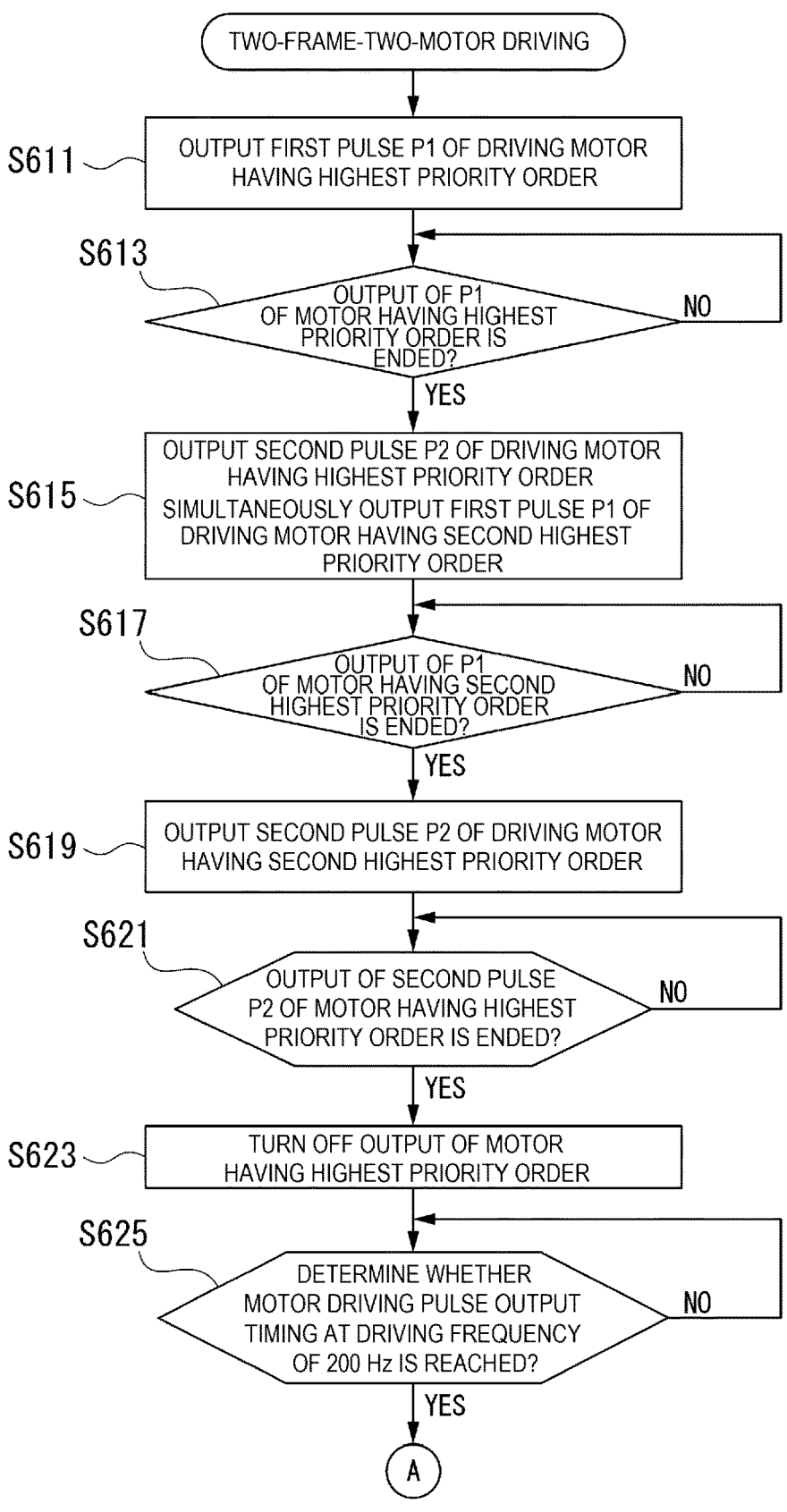
FIG. 15A is a first diagram of a sixth flowchart showing an example of a stopwatch clocking process of the watch according to the present embodiment.
Figure 15B:
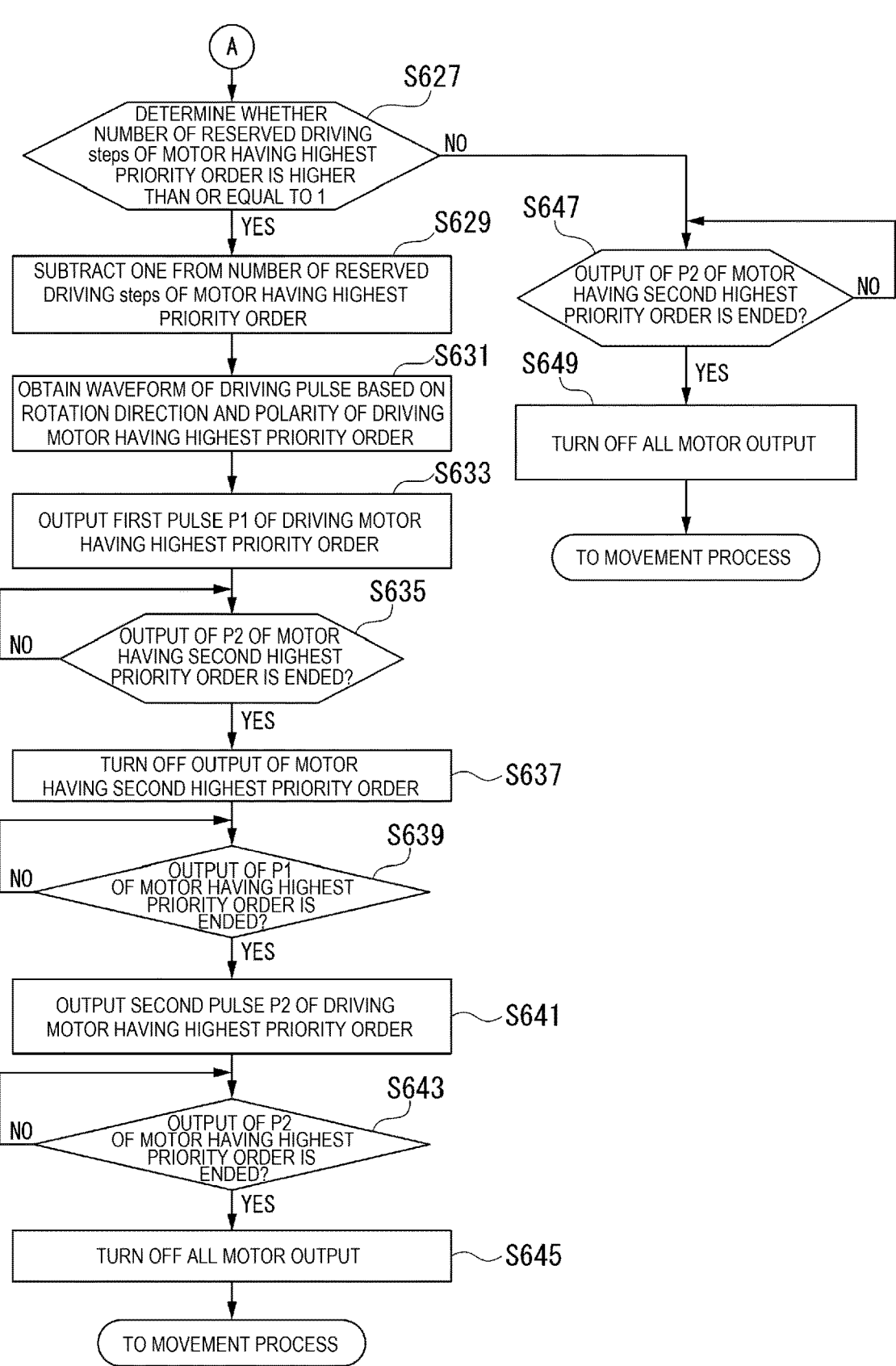
FIG. 15B is a second diagram of the sixth flowchart showing the example of the stopwatch clocking process of the watch according to the present embodiment.

FIGS. 15A and 15B are a sixth flowchart showing an example of a stopwatch clocking process of the watch according to the present embodiment. An example of the two-frame-two-motor driving process will be described with reference to FIGS. 15A and 15B. The two-frame-two-motor driving process is, for example, a motor driving process as shown from t315 to t317 in FIG. 5.

The control unit 20 outputs the first pulse P1 of the motor having the highest priority order (step S611). If the output of the first pulse P1 of the motor having the highest priority order ends (step S613), the control unit 20 outputs the second pulse P2 of the motor having the highest priority order and simultaneously outputs the first pulse P1 of the motor having the second highest priority order (step S615). If the output of the first pulse P1 of the motor having the second highest priority order ends (step S617), the control unit 20 outputs the second pulse P2 of the motor having the second highest priority order (step S619). Next, if the output of the second pulse P2 of the motor having the highest priority order ends (step S621), the control unit 20 turns off the output of the motor having the highest priority order (step S623). Here, in the two-frame-two-motor driving process, the second pulse P2 of the motor having the second highest priority order is being output.

The control unit 20 determines whether a driving pulse output timing at the driving frequency of 200 [Hz] is reached (step S625). If the driving pulse output timing at the driving frequency of 200 [Hz] is reached, the control unit 20 performs a process according to the number of reserved driving steps of the motor having the highest priority order (step S627).

If the number of reserved driving steps of the motor having the highest priority order is not one or more (step S627: NO), the control unit 20 determines whether the output of the second pulse P2 of the motor having the second highest priority order ends (step S647). If the output of the second pulse P2 of the motor having the second highest priority order ends, the control unit 20 turns off all the motor output (step S649), and returns the process to the movement process described with reference to FIG. 12.

If the number of reserved driving steps of the motor having the highest priority order is one or more (step S627: YES), the control unit 20 subtracts one from the number of reserved driving steps of the motor having the highest priority order (step S629). The control unit 20 obtains a waveform of a driving pulse to be output based on the rotation direction, the polarity, and the like of the motor having the highest priority order (step S631). The rotation direction, the polarity, and the like of the motor are stored in the storage unit 30. Next, the control unit 20 outputs the first pulse P1 of the motor having the highest priority order (step S633). Next, if the output of the second pulse P2 of the motor having the second highest priority order ends (step S635), the control unit 20 turns off the output of the motor having the second highest priority order (step S637). Next, if output of the first pulse P1 of the motor having the highest priority order ends (step S639), the control unit 20 outputs the second pulse P2 of the motor having the highest priority order (step S641). Next, if output of the second pulse P2 of the motor having the highest priority order ends (step S643), the control unit 20 turns off all the motor output (step S645), and returns the process to the movement process described with reference to FIG. 12.

Figure 16A:
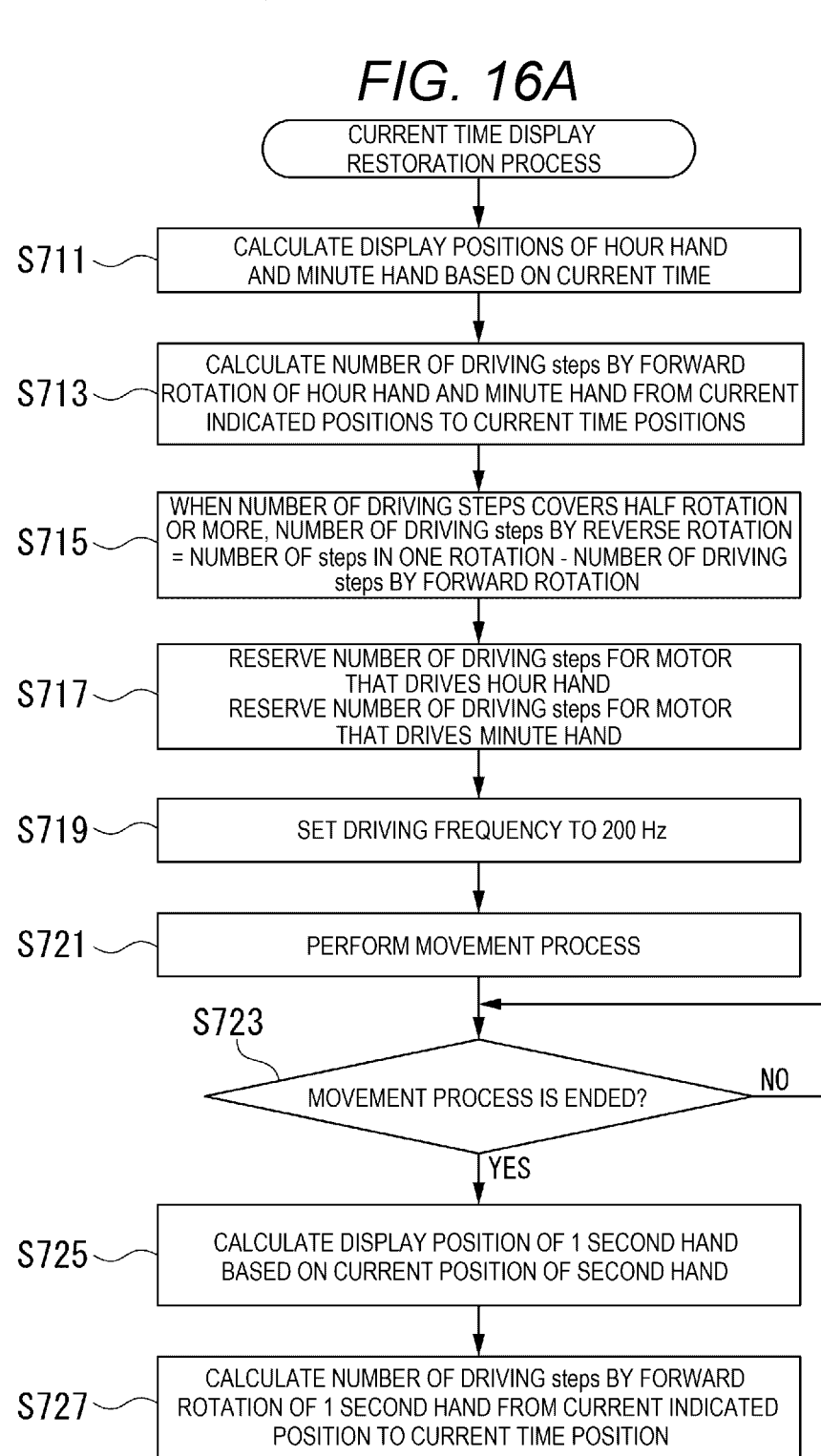
FIG. 16A is a first diagram of a seventh flowchart showing an example of a stopwatch clocking process of the watch according to the present embodiment.

FIGS. 16A and 16B are a seventh flowchart showing an example of a stopwatch clocking process of the watch according to the present embodiment. An example of a current time display restoration process will be described with reference to FIGS. 16A and 16B.

First, the control unit 20 calculates positions of the minute hand 64B and the hour hand 65B when a current time is displayed (step S711). Next, the control unit 20 calculates the number of driving steps necessary to move the minute hand 64B and the hour hand 65B by forward rotation from current indicated positions of the minute hand 64B and the hour hand 65B (for example, indicated positions at the end of the stopwatch function) to the calculated positions (current time positions) (step S713). The control unit 20 determines whether the number of calculated driving steps covers half rotation or more, and determines to perform the movement by forward rotation when the number of calculated driving steps covers half rotation or less, and by reverse rotation when the number of calculated driving steps covers half rotation or more (step S715). Here, the number of driving steps by reverse rotation is a value obtained by subtracting the number of driving steps by forward rotation from the number of steps in one rotation.

The control unit 20 reserves the number of driving steps for the fourth motor 64 that moves the minute hand 64B. In addition, the control unit 20 reserves the number of driving steps for the fifth motor 65 that moves the hour hand 65B (step S717). The control unit 20 sets the driving frequency of the fourth motor 64 and the fifth motor 65 to 200 [Hz] (step S719), and performs the movement process by outputting the driving pulse to the driving unit 40 (step S721). The driving frequency is stored in the storage unit 30. The one-frame-two-motor driving process described with reference to FIG. 14 may be used for the movement.

If the movement process ends (step S723), the control unit 20 calculates a position of the 1 second hand 63B when a current time is displayed (step S725). Next, the control unit 20 calculates the number of driving steps necessary to move the 1 second hand 63B by forward rotation from a current indicated position of the 1 second hand 63B (for example, an indicated position at the end of the stopwatch function) to the calculated position (current time position) (step S727). The control unit 20 determines whether the number of calculated driving steps covers half rotation or more, and determines to perform the movement by forward rotation when the number of calculated driving steps covers half rotation or less, and by reverse rotation when the number of calculated driving steps covers half rotation or more (step S729).

The control unit 20 reserves the number of driving steps for the third motor 63 that moves the 1 second hand 63B (step S731). The control unit 20 sets a driving frequency of the third motor 63 to 100 [Hz] (step S733), and performs the movement process by outputting the driving pulse to the driving unit 40 (step S735). The driving frequency is stored in the storage unit 30. The one-frame-one-motor driving process described with reference to FIG. 13 may be used for the movement.

If the movement process ends (step S737), the control unit 20 calculates the number of driving steps necessary to move the $\frac{1}{10}$ seconds hand 62B and the $\frac{1}{100}$ seconds hand 61B by forward rotation from current indicated positions of the $\frac{1}{10}$ seconds hand 62B and the $\frac{1}{100}$ seconds hand 61B (for example, indicated positions at the end of the stopwatch function) to a 0 position (step S739). The control unit 20 determines whether the number of calculated driving steps covers half rotation or more, and determines to perform the movement by forward rotation when the number of calculated driving steps covers half rotation or less, and by reverse rotation when the number of calculated driving steps covers half rotation or more (step S741).

The control unit 20 reserves the number of driving steps for the second motor 62 that moves the $\frac{1}{10}$ seconds hand 62B. In addition, the control unit 20 reserves the number of driving steps for the first motor 61 that moves the $\frac{1}{100}$ seconds hand 61B (step S743). The control unit 20 sets driving frequencies of the second motor 62 and the first motor 61 to 200 [Hz] (step S745), and performs the movement process by outputting the driving pulse to the driving unit 40 (step S745). The driving frequencies are stored in the storage unit 30. The one-frame-two-motor driving process described with reference to FIG. 14 may be used for the movement. If the movement process ends (step S749), the control unit 20 ends the process.

Summary of Embodiment

According to the embodiment described above, the stepping motor control device includes the control unit 20, thereby controlling the driving unit 40 that drives a plurality of motors to drive the motors by outputting a driving pulse. Specifically, the watch 1 according to the present embodiment includes at least the first motor 61 and the second motor 62. The first motor 61 is driven at a prescribed driving cycle, and the second motor 62 is driven at a driving cycle that is the same as or an integral multiple of the driving cycle of the first motor 61. The control unit 20 drives the first motor 61 by outputting the first driving pulse, and drives the second motor 62 by outputting the second driving pulse. The stepping motor control device includes the storage unit 30 to store a width of the first driving pulse and a width of the second driving pulse.

In addition, according to the stepping motor control device, when a sum of the pulse width of the first driving pulse and the pulse width of the second driving pulse is longer than the driving cycle (for example, 5 [ms]) of the first motor 61, a part of the first driving pulse and at least a part of the second driving pulse are simultaneously output in the driving cycle of the first motor 61, and a pause period is provided in the driving cycle. The pause period is a period in which neither the first driving pulse nor the second driving pulse is output after the first driving pulse and the second driving pulse are output and before the start timing of the next driving cycle of the first motor 61. According to the present embodiment, by providing the pause period, it is possible to drive the plurality of motors at a high speed while effectively preventing a decrease in the terminal voltage of the battery 10. In other words, the stepping motor control device can prevent the decrease in the terminal voltage of the battery 10 even when the plurality of motors are driven simultaneously at a high speed.

In addition, according to the embodiment described above, the storage unit 30 further stores a prescribed time from when the first driving pulse is output to when the second driving pulse is output, and the control unit 20 outputs the second driving pulse after the prescribed time elapses after the first driving pulse is output. That is, according to the present embodiment, driving pulses of two motors driven simultaneously are not output simultaneously. Therefore, according to the present embodiment, it is possible to shift a driving start timing of the simultaneously driven motors and shift a generation timing of a peak of a consumption current. Thus, according to the present embodiment, the decrease in the terminal voltage of the battery 10 can be prevented.

The prescribed time from when the first driving pulse is output to when the second driving pulse is output may be, for example, the same as that of the first pulse P1 of the motor to be driven first. In this case, the storage unit 30 does not need to store the prescribed time from when the first driving pulse is output to when the second driving pulse is output independently of a width of the first pulse P1.

In addition, according to the embodiment described above, the storage unit 30 stores the upper limit value of the number of motors that can be driven simultaneously and a priority order for each of the plurality of motors controlled by the control unit 20. When the number of motors to be driven simultaneously exceeds the upper limit value, the control unit 20 drives the motor having the highest priority order, and drives the motor having the second highest priority order after the motor having the highest priority order is stopped. According to the present embodiment, since the upper limit value of the number of motors that can be driven simultaneously is limited, it is possible to prevent the peak of the consumption current, and it is possible to prevent the decrease in the terminal voltage of the battery 10.

According to the embodiment described above, the control unit 20 drives a plurality of motors having different measurement units, the priority order stored in the storage unit 30 is set according to the measurement unit of each of the motors, and the priority order of a motor having a small measurement unit is higher than the priority order of a motor having a large measurement unit. According to the present embodiment, since the motor having a small measurement unit has a high priority order and is preferentially driven, a measurement error can be reduced.

In addition, according to the embodiment described above, the control unit 20 further drives the third motor 63 by outputting the third driving pulse, and the upper limit value of the number of motors that can be driven simultaneously stored in the storage unit 30 is two. According to the present embodiment, since an upper limit of the number of motors that can be driven simultaneously is limited to two, it is possible to prevent the peak of the consumption current, and it is possible to prevent the decrease in the terminal voltage of the battery 10.

According to the embodiment described above, the first motor 61 is the motor that drives the $\frac{1}{100}$ seconds hand 61B, the second motor 62 is the motor that drives the $\frac{1}{10}$ seconds hand 62B, and the third motor 63 is the motor that drives the 1 second hand 63B. According to the present embodiment, the first motor 61 is set to have the highest priority order. According to the present embodiment, since the priority order of the first motor 61 that moves the $\frac{1}{100}$ seconds hand 61B having the smallest measurement unit is set to be highest, the first motor 61 is preferentially driven, and thus the measurement error can be reduced.

In addition, according to the embodiment described above, the control unit 20 operates the prescribed motors in combination, and after the operation of the combined motors ends, drives the next combination of motors. Here, in a case where the number of motors driven simultaneously is limited, when motors having different driving frequencies are paired, there may be a place where a pause time cannot be ensured. In the present embodiment, the motors to be combined are preferably motors having the same driving frequency. Therefore, according to the present embodiment, it is possible to ensure the pause time more reliably by driving at different times without combining motors having different driving frequencies. As a result, the stepping motor control device can prevent the decrease in the terminal voltage of the battery 10 even when the plurality of motors are driven simultaneously at a high speed.

Although the embodiment of the invention has been described above with reference to the drawings, specific configurations are not limited to the embodiment described above, and design changes and the like are also included without departing from the gist of the invention.

What is claimed is:

1. A stepping motor control device comprising:
   a control unit configured to control a driving unit that drives a plurality of motors including a first motor driven at a prescribed driving cycle and a second motor driven at a driving cycle that is the same as or an integral multiple of the driving cycle of the first motor to drive the first motor by outputting a first driving pulse and to drive the second motor by outputting a second driving pulse; and
   a storage unit configured to store a width of the first driving pulse and a width of the second driving pulse, wherein
   when a sum of a pulse width of the first driving pulse and a pulse width of the second driving pulse is longer than the driving cycle of the first motor, in the driving cycle of the first motor, a part of the first driving pulse and at least a part of the second driving pulse are simultaneously output, and a pause period is provided, in which neither the first driving pulse nor the second driving pulse is output after the first driving pulse and the second driving pulse are output and before a start timing of a next driving cycle of the first motor.

2. The stepping motor control device according to claim 1, wherein
   the storage unit further stores a prescribed time from when the first driving pulse is output to when the second driving pulse is output, and
   the control unit outputs the second driving pulse after the prescribed time elapses after the first driving pulse is output.

3. The stepping motor control device according to claim 1, wherein
   the storage unit stores an upper limit value of the number of motors that can be driven simultaneously and a priority order for each of the plurality of motors controlled by the control unit, and when the number of motors to be driven simultaneously exceeds the upper limit value, the control unit drives a motor having a highest priority order, and drives a motor having a second highest priority order after the motor having the highest priority order stops.

4. The stepping motor control device according to claim 3, wherein the control unit drives a plurality of motors having different measurement units, the priority order is set according to the measurement unit of each of the motors, and the priority order of a motor having a small measurement unit is higher than the priority order of a motor having a large measurement unit.

5. The stepping motor control device according to claim 3, wherein the control unit further drives a third motor by outputting a third driving pulse, and the upper limit value of the number of motors that can be driven simultaneously stored in the storage unit is two.

6. The stepping motor control device according to claim 4, wherein the control unit further drives a third motor by outputting a third driving pulse, and the upper limit value of the number of motors that can be driven simultaneously stored in the storage unit is two.

7. The stepping motor control device according to claim 5, wherein the first motor is a motor that drives a 1/100 seconds hand, the second motor is a motor that drives a 1/10 seconds hand, the third motor is a motor that drives a 1 second hand, and the priority order of the first motor is set to be highest.

8. The stepping motor control device according to claim 6, wherein the first motor is a motor that drives a 1/100 seconds hand, the second motor is a motor that drives a 1/10 seconds hand, the third motor is a motor that drives a 1 second hand, and the priority order of the first motor is set to be highest.

9. The stepping motor control device according to claim 1, wherein the control unit operates prescribed motors in combination, and drives a next combination of motors after the operation of the combined motors ends.

10. The stepping motor control device according to claim 2, wherein the control unit operates prescribed motors in combination, and drives a next combination of motors after the operation of the combined motors ends.

11. A movement comprising:

the stepping motor control device according to claim 1;

the first motor; and the second motor.

12. A movement comprising:

the stepping motor control device according to claim 2;

the first motor; and the second motor.

13. A watch comprising:

the movement according to claim 11.

14. A watch comprising:

the movement according to claim 12.

15. A stepping motor control method comprising:

a control step of controlling a driving unit that drives a plurality of motors including a first motor driven at a prescribed driving cycle and a second motor driven at a driving cycle that is the same as or an integral multiple of the driving cycle of the first motor to drive the first motor by outputting a first driving pulse and to drive the second motor by outputting a second driving pulse; and a storage step of storing a width of the first driving pulse and a width of the second driving pulse, wherein when a sum of a pulse width of the first driving pulse and a pulse width of the second driving pulse is longer than the driving cycle of the first motor, in the driving cycle of the first motor, a part of the first driving pulse and at least a part of the second driving pulse are simultaneously output, and a pause period is provided, in which neither the first driving pulse nor the second driving pulse is output after the first driving pulse and the second driving pulse are output and before a start timing of a next driving cycle of the first motor.

* * * * *